(12) United States Patent
Kim et al.

(10) Patent No.: US 12,046,997 B2
(45) Date of Patent: Jul. 23, 2024

(54) ISOLATED RESONANT CONVERTER AND CONTROL METHOD THEREOF

(71) Applicant: Delta Electronics, Inc., Taipei (TW)

(72) Inventors: Jong Woo Kim, Cary, NC (US); Peter Mantovanelli Barbosa, Cary, NC (US); Hao Sun, Shanghai (CN); Minli Jia, Shanghai (CN)

(73) Assignee: DELTA ELECTRONICS, INC., Taipei (TW)

( * ) Notice: Subject to any disclaimer, the term of this patent is extended or adjusted under 35 U.S.C. 154(b) by 0 days.

(21) Appl. No.: 17/192,275

(22) Filed: Mar. 4, 2021

(65) Prior Publication Data

US 2022/0014099 A1    Jan. 13, 2022

Related U.S. Application Data

(60) Provisional application No. 63/051,171, filed on Jul. 13, 2020.

(51) Int. Cl.
| | |
|---|---|
| *H02M 3/00* | (2006.01) |
| *H02M 1/00* | (2006.01) |
| *H02M 1/08* | (2006.01) |
| *H02M 3/335* | (2006.01) |

(52) U.S. Cl.
CPC ............ *H02M 3/01* (2021.05); *H02M 1/083* (2013.01); *H02M 3/3353* (2013.01); *H02M 1/0058* (2021.05)

(58) Field of Classification Search
CPC .. H02M 3/01; H02M 3/3353; H02M 3/33569; H02M 3/33571; H02M 3/33592; H02M 1/08; H02M 1/083; H02M 1/0058; H02M 1/0054; H02M 1/0048
See application file for complete search history.

(56) References Cited

U.S. PATENT DOCUMENTS

| | | | |
|---|---|---|---|
| 4,953,068 A | 8/1990 | Henze | |
| 10,044,278 B2 * | 8/2018 | Kondo | ............... H02M 3/33546 |
| 10,277,140 B2 * | 4/2019 | Jia | ............................ H02M 1/14 |

(Continued)

FOREIGN PATENT DOCUMENTS

| | | |
|---|---|---|
| CN | 107968571 A | 4/2018 |
| CN | 110912429 A | 3/2020 |

(Continued)

OTHER PUBLICATIONS

Jang Yungtaek et al. Series-resonant converter with reduced-frequency-range control, Mar. 2015, IEE , pp. 1453-1460 (Year: 2015).*

(Continued)

*Primary Examiner* — Gustavo A Rosario-Benitez
(74) *Attorney, Agent, or Firm* — KIRTON McCONKIE; Evan R. Witt

(57) ABSTRACT

The present disclosure provides a single- and multi-phase DC/DC converter and a control method thereof that can offer a wide range of voltage conversion ratio by substantially reducing the switching frequency range, thereby resulting in performance improvement. Reduction in the switching frequency range is achieved by controlling the output voltage or current with a combination of variable duty ratio, variable frequency, and delay-time control.

13 Claims, 26 Drawing Sheets

(56) References Cited

U.S. PATENT DOCUMENTS

| | | | |
|---|---|---|---|
| 2010/0225289 A1* | 9/2010 | Chang | H02M 3/28 323/282 |
| 2010/0315840 A1* | 12/2010 | Cohen | H02M 3/33507 363/21.04 |
| 2011/0103097 A1 | 5/2011 | Wang et al. | |
| 2011/0149607 A1 | 6/2011 | Jungreis et al. | |
| 2014/0009968 A1* | 1/2014 | Matsuura | H02M 3/33592 363/17 |
| 2014/0254209 A1 | 9/2014 | Takagi et al. | |
| 2014/0334189 A1* | 11/2014 | Yan | H02M 3/33584 363/17 |
| 2015/0117067 A1 | 4/2015 | Naiknaware et al. | |
| 2015/0229225 A1* | 8/2015 | Jang | H02M 3/285 363/17 |
| 2015/0244278 A1* | 8/2015 | Hirano | B60L 53/22 307/24 |
| 2015/0365002 A1* | 12/2015 | Cao | H02M 3/33507 363/21.01 |
| 2015/0372622 A1 | 12/2015 | Ortiz | |
| 2016/0233766 A1 | 8/2016 | Todorov et al. | |
| 2019/0393769 A1 | 12/2019 | Wei et al. | |
| 2020/0007032 A1 | 1/2020 | Elferich et al. | |

FOREIGN PATENT DOCUMENTS

| | | |
|---|---|---|
| EP | 3059847 A1 | 8/2016 |
| JP | 2017051082 A | 3/2017 |
| JP | 2020102933 A | 7/2020 |
| JP | 2022017179 A | 1/2022 |
| TW | 201123705 A | 7/2011 |
| TW | 201238221 A | 9/2012 |
| WO | 2015056571 A1 | 4/2015 |
| WO | 2019206231 A1 | 10/2019 |

OTHER PUBLICATIONS

J.-W. Kim, M. Lee, and J.-S. Lai, "Efficient LLC Resonant ConverterWith a Simple Hold-Up Time Compensation in Voltage DoublerRectifier," IEEE Journal of Emerging and Selected Topics in Power Electronics, vol. 7, No. 2, Jun. 2019.

Suyash Sushilumar Shah et al., An Approach to Unified Full-order Modeling of Dual Active Bridge Type Converters, IEEE, 2018, pp. 986-992.

Jeferson Fraytag et al., Impact analysis of a multi-variables modulation on the transformer of the dual-active-bridge converter, IET Power Electron, 2020, vol. 13, Iss. 5, pp. 1041-1050.

* cited by examiner

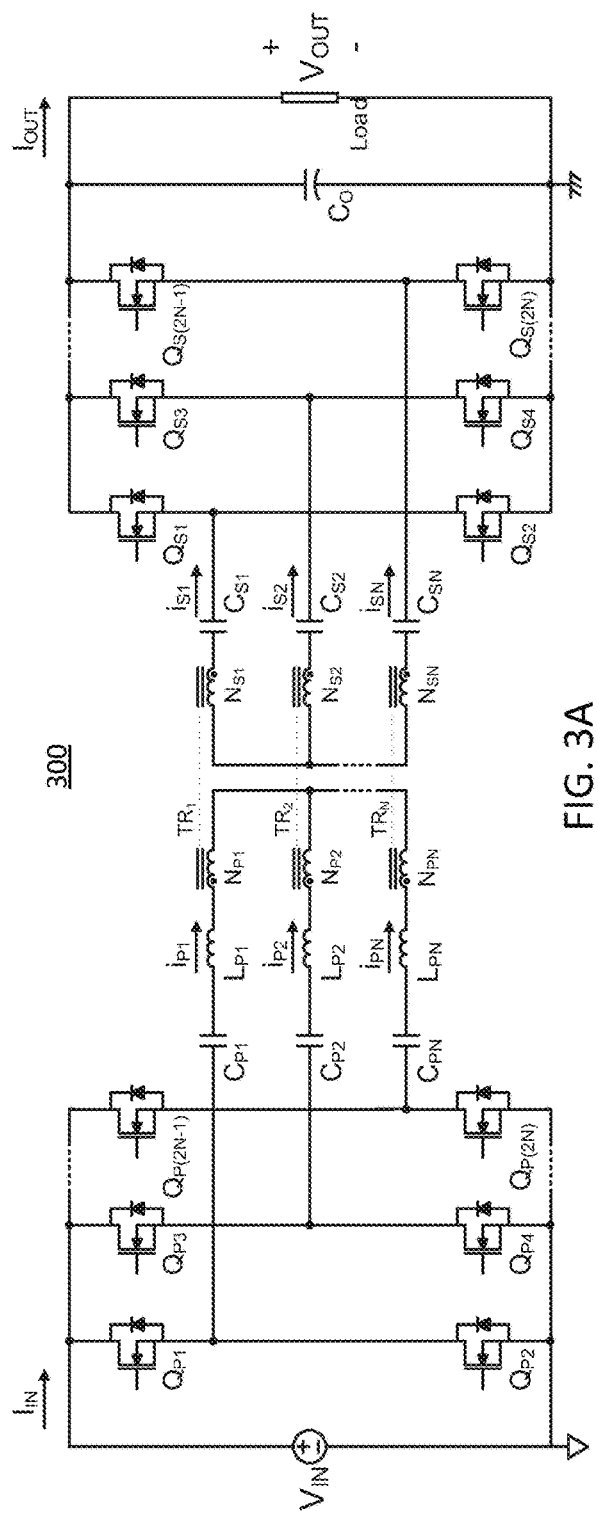
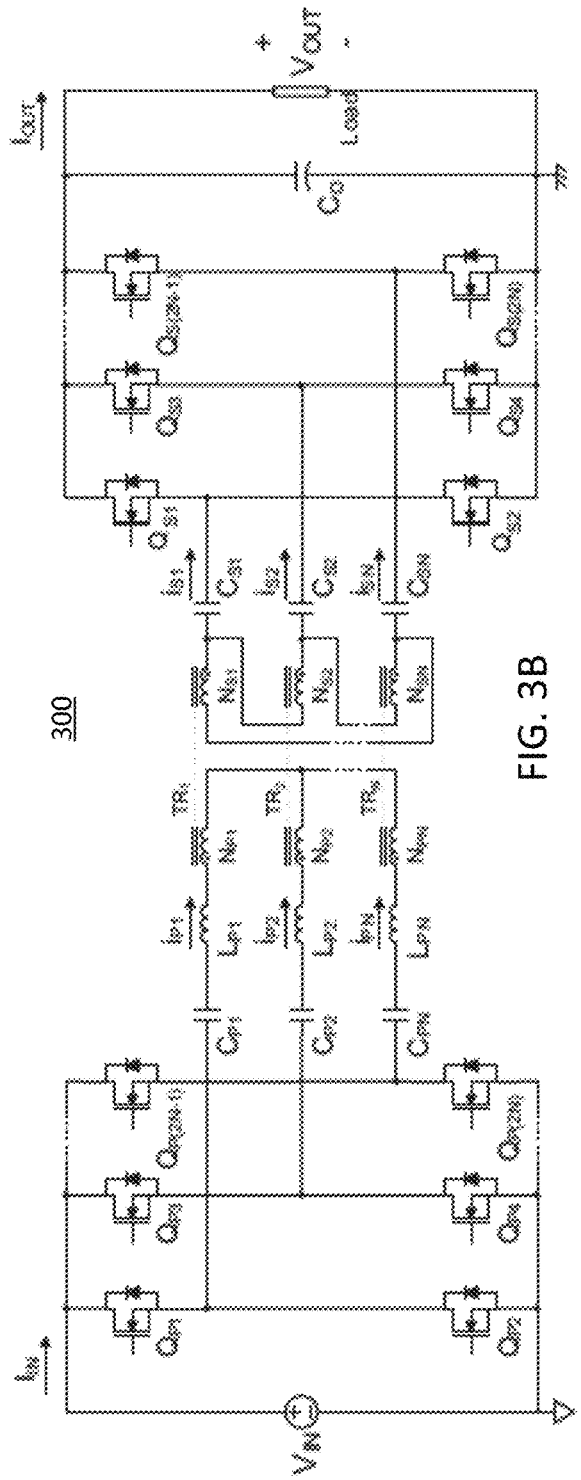
FIG. 3A
FIG. 3B

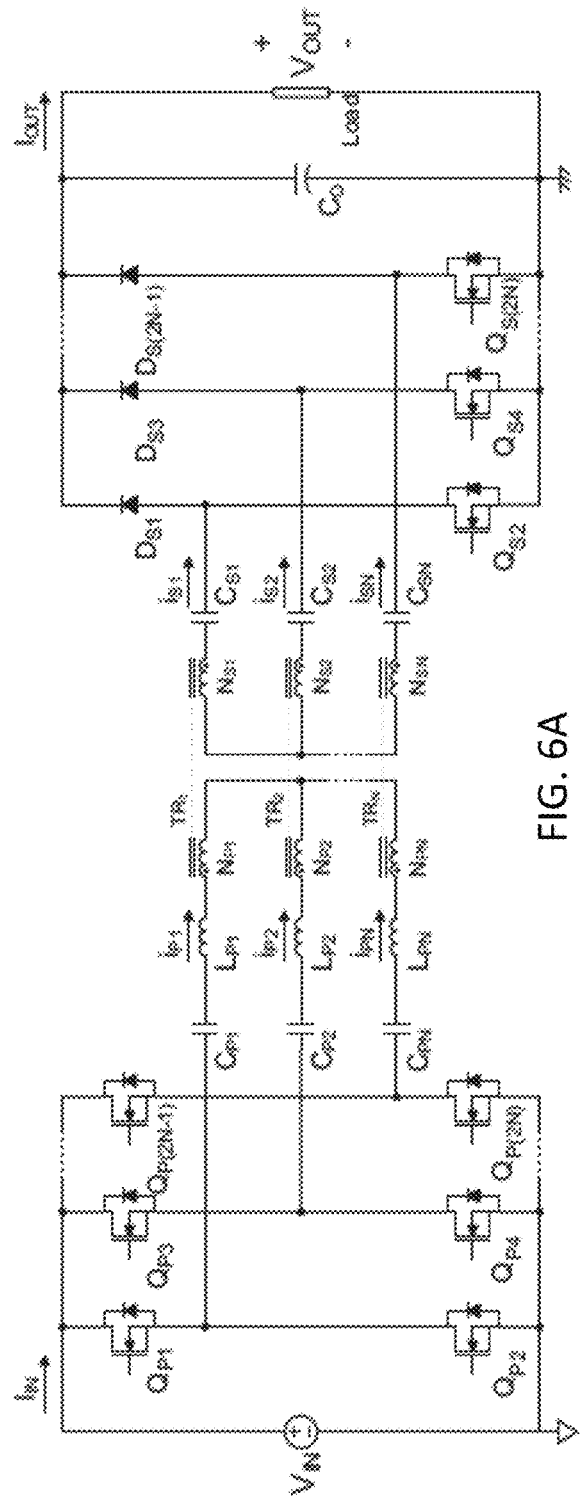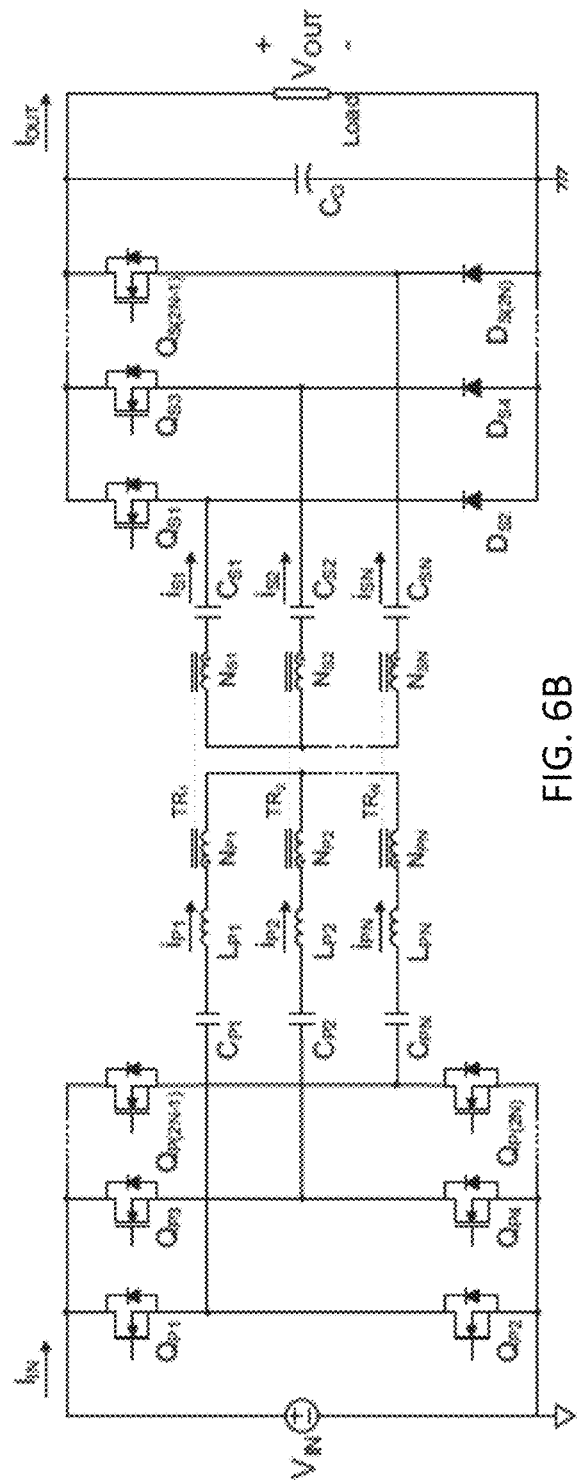
FIG. 6A
FIG. 6B

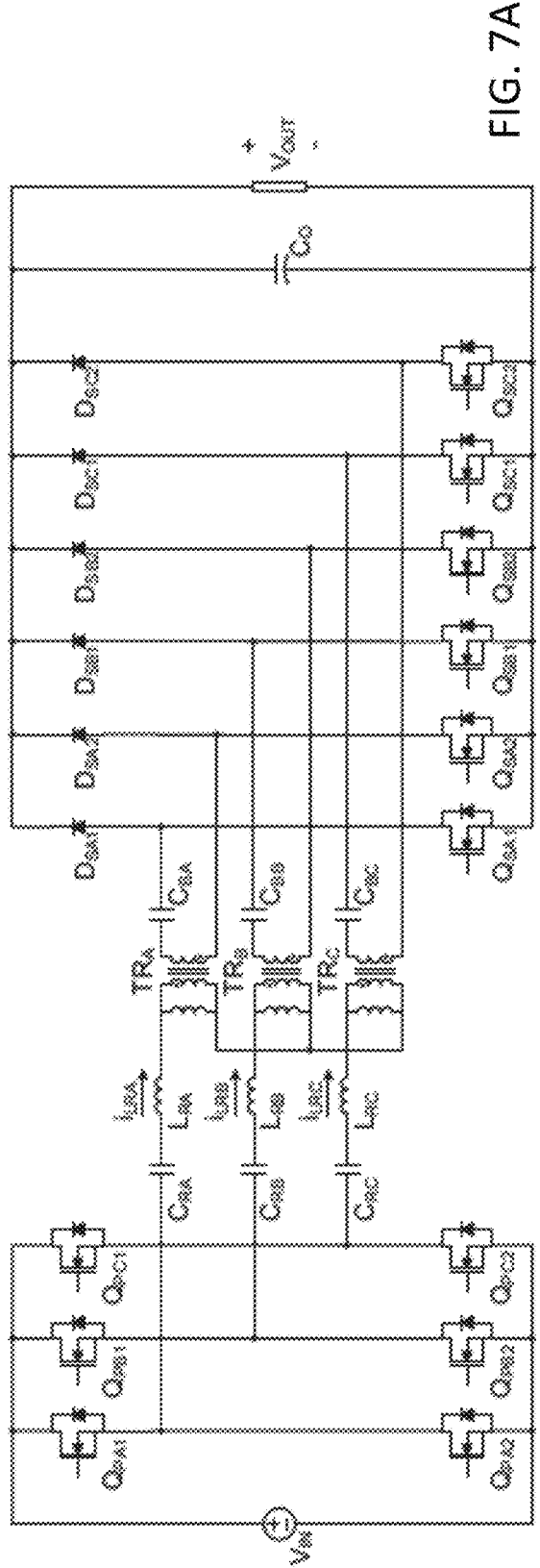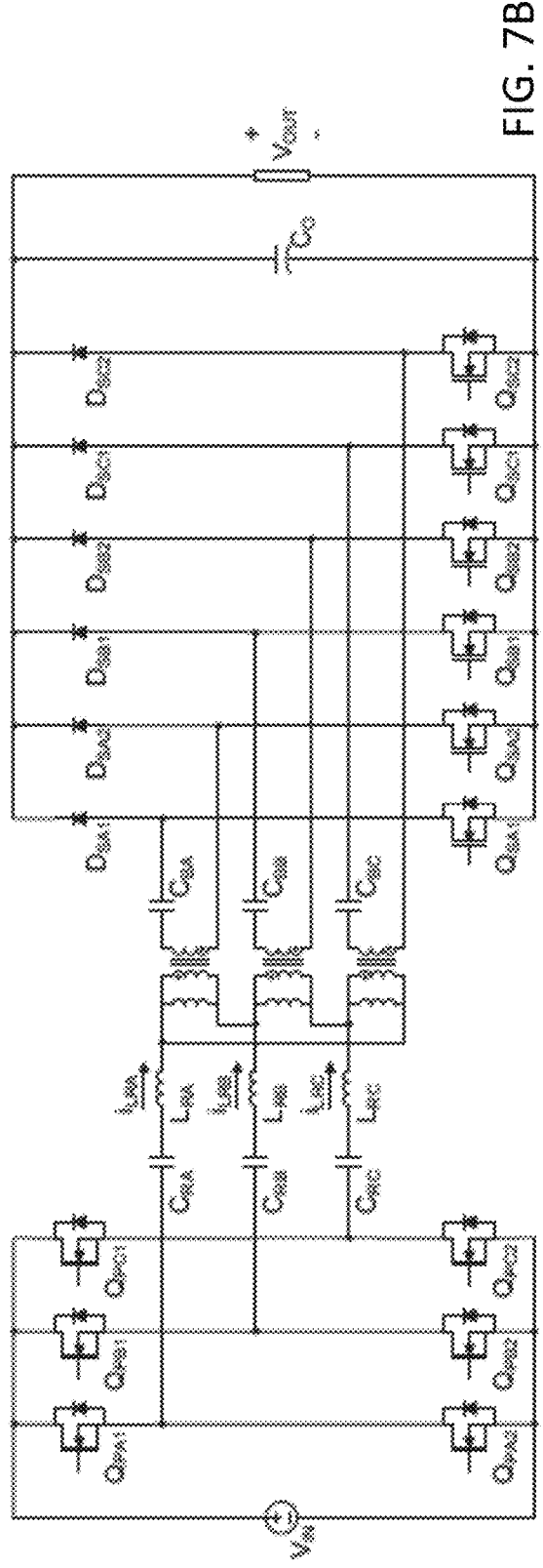
FIG. 7A
FIG. 7B

ISOLATED RESONANT CONVERTER AND CONTROL METHOD THEREOF

RELATED APPLICATION

This application claims the benefit of priority to U.S. Provisional Application No. 63/051,171, filed Jul. 13, 2020, the entire contents of which are incorporated herein by reference for all purposes.

TECHNICAL FIELD

The present disclosure relates to an isolated resonant DC/DC converter and a method for controlling the converter. More particularly, the present disclosure relates to a single- or multi-phase isolated resonant converter and a method for controlling the isolated resonant converter so as to achieve an increased input/output voltage range.

BACKGROUND

The power supply industry continuously demands converters with high efficiency, high power density, and low cost in order to achieve less energy consumption, smaller installation space, and cost effectiveness. In addition, higher power processing is required in many newly developed applications such as electrical vehicles (EV) and data centers. By using higher power rated converters, charging time of EVs and the size of power racks in data centers can be significantly reduced. In general, a resonant converter uses a resonant-tank circuit to shape voltage or current waveforms, or both, to minimize switching losses and to allow high frequency operations without compromising conversion efficiency. Resonant converters are therefore extensively used in state-of-the-art power supplies that offer the highest efficiency and power density.

FIG. 1A shows a typical full-bridge topology for an isolated resonant power converter 100, in which the resonant-tank circuit includes resonant inductor $L_P$ and capacitors $C_P$ and $C_S$. Converter 100 in FIG. 1A is a series resonant converter (SRC), because resonant-tank components $L_P$, $C_P$, and $C_S$ are connected in series through a transformer TR. Inductor $L_P$ can be located either at the primary side or at the secondary side (or both). Also, one of capacitors $C_P$ and $C_S$ (or both) can be employed together with inductor $L_P$ so that at least one inductor and one capacitor are connected in series to form a resonant-tank circuit. In order to minimize conduction losses, low on-resistance metal-oxide-semiconductor field effect transistors (MOSFETs) can be utilized as the secondary side rectifiers instead of diodes. Using MOSFETs as the secondary side rectifiers also makes converter 100 bidirectional, because the MOSFETs as the secondary side rectifiers allow power current to flow from the secondary side to the primary side.

In the case of SRC, the magnetizing inductance $L_m$ of transformer TR is much larger (e.g., more than 10 times) than the inductance of $L_P$. When the magnetizing inductance of transformer TR is only several times (e.g., 2 to 10 times) of the inductance of inductor $L_P$, such a converter is called an LLC resonant converter. Since transformer TR of a LLC resonant converter has relatively small magnetizing inductance, circulating current through the magnetizing inductance is larger than that of an SRC. Because of the large circulating current, the LLC converter achieves wide range of zero-voltage-switching (ZVS) at the expense of conduction loss.

FIG. 1B shows waveforms of switch-control signals for primary and secondary side switches $Q_{P1-P4}$ and $Q_{S1-S4}$, and primary side current $i_P$. In the primary side, switch-control signals for $Q_{P1}$ and $Q_{P4}$ are complementary to those for $Q_{P2}$ and $Q_{P3}$. Duty ratio of each switch-control signal is usually 50% in order to obtain a symmetrical $i_P$ waveform. The primary side current waveform is sinusoidal due to the resonance of resonant-tank components $L_P$, $C_P$ and $C_S$. In order to achieve ZVS, the switching frequency is slightly greater than the resonant frequency that is determined by resonant-tank components $L_P$, $C_P$ and $C_S$. By doing so, primary side current $i_P$ at switching instants of primary side switches $Q_{P1-P4}$ (i.e., $i_P$ at time $t_2$ and $t_3$ in FIG. 1B) becomes ZVS current for primary side switches $Q_{P1-P4}$. Primary side current $i_P$ is delivered to the secondary side and divided by the turns ratio of transformer TR (i.e., $i_S = i_P/n$, where $n = N_P/N_S$, and $N_P$ and $N_S$ denote the number of turns of primary and secondary side windings, respectively).

Switch-control signals for secondary side switches $Q_{S1-S4}$ are determined according to the sign of $i_P$. Switches $Q_{S1}$ and $Q_{S4}$ are turned on and switches $Q_{S2}$ and $Q_{S3}$ are turned off while $i_P$ is positive, whereas switches $Q_{S1}$ and $Q_{S4}$ are turned off and switches $Q_{S2}$ and $Q_{S3}$ are turned on while $i_P$ is negative. To achieve ZVS in a practical implementation, a rising edge delay (e.g., time instants $t_0$, $t_1$, $t_2$, and $t_3$) is introduced to all switch-control signals so that both complementary switches in a leg can be turned off during a short time, which is called dead time. During this dead time, the primary side current is commutated from the switch that is being turned off to the antiparallel diode in the complementary switch, so as to create a condition for the complementary switch's subsequent ZVS turning on.

The output current value provided to the load becomes the average value of secondary side current is. Because secondary side current is has a sinusoidal waveform, the peak value of the secondary side current becomes always larger than the output current, causing a large root-mean-square (RMS) current in converter 100, thereby resulting in temperature increase of devices due to conduction loss. A large RMS current also becomes a drawback of a resonant converter, especially in an application with a large current or large power. Large conduction losses and temperature increase of devices limit the maximum power delivery capability of a converter, because the thermal capacity of a component is physically limited. In a large current or large power application, temperature control is a critical issue related to the reliability of the converter.

FIG. 2A shows a typical three-phase isolated SRC 200 including three phases: phase 1, phase 2, and phase 3. Each phase of three-phase isolated SRC 200 comprises two primary side switches, resonant-tank devices, a transformer, and two secondary side switches. For example, for phase 1, switches $Q_{P1}$ and $Q_{P2}$ are the primary side switches; inductor $L_{P1}$ and capacitors $C_{P1}$ and $C_{S1}$ are the resonant-tank devices; transformer TR1 is the phase 1 transformer; and switches $Q_{S1}$ and $Q_{S2}$ are the secondary side switches. Likewise, for phase 2, switches $Q_{P3}$ and $Q_{P4}$ are the primary side switches; inductor $L_{P2}$ and capacitors $C_{P2}$ and $C_{S2}$ are the resonant-tank devices; transformer TR2 is the phase 2 transformer; and switches $Q_{S3}$ and $Q_{S4}$ are the secondary side switches. Moreover, for phase 3, switches $Q_{P5}$ and $Q_{P6}$ are the primary side switches; inductor $L_{P3}$ and capacitors $C_{P3}$ and $C_{S3}$ are the resonant-tank devices; transformer TR3 is the phase 3 transformer; and switches $Q_{S5}$ and $Q_{S6}$ are the secondary side switches.

The most powerful advantage of a multi-phase SRC is that each phase delivers a fraction of the total output power.

In three-phase SRC 200, current stress in a phase becomes one-third of that of a single-phase SRC 100 shown in FIG. 1A, which means RMS current stress on each resonant-tank device also becomes one-third. Considering that resistive conduction loss is proportional to the square value of RMS current, conduction loss of each resonant-tank device becomes one-ninth of that of a single-phase SRC. Therefore, a three-phase SRC has much higher power delivery capability.

FIG. 2B shows waveforms of switch-control signals for the primary and secondary side switches $Q_{P1}$, $Q_{P3}$, $Q_{P5}$ and $Q_{S1}$, and primary side current $i_{P1}$, $i_{P2}$, and $i_{P3}$. For simplicity, switch-control signals for switches $Q_{P2}$, $Q_{P4}$, $Q_{P6}$, $Q_{S2}$, $Q_{S3}$, $Q_{S4}$, $Q_{S5}$, and $Q_{S6}$ are omitted. Switch control signals for switches $Q_{P2}$, $Q_{P4}$, and $Q_{P6}$ are complementary to those of switches $Q_{P1}$, $Q_{P3}$, and $Q_{P5}$, respectively. Similar to a single-phase SRC, secondary side switches are turned on according to the sign of the primary side current in each phase. Accordingly, switches $Q_{S1}$, $Q_{S3}$, and $Q_{S5}$ are turned on while $i_{P1}$, $i_{P2}$, and $i_{P3}$ are positive, respectively. On the other hand, switches $Q_{S2}$, $Q_{S4}$, and $Q_{S6}$ are turned on while $i_{P1}$, $i_{P2}$, and $i_{P3}$ are negative, respectively. ZVS is achieved in a similar way to the single-phase SRC. As shown in FIG. 2B, switch-control signals for switches $Q_{P1}$, $Q_{P3}$, and $Q_{P5}$ are interleaved with 120 degrees phase-shift angle ($T_S/3$ shift in time domain). By doing so, RMS current on filter capacitor $C_0$ is also dramatically reduced. For these reasons, an SRC can increase its maximum power delivery capability by forming a multi-phase structure.

The voltage conversion ratio ($V_{OUT}/V_{IN}$) of a resonant converter is controlled by varying the switching frequency. For example, an SRC can provide the maximum voltage conversion ratio at the resonant switching frequency, and the voltage conversion ratio decreases as the switching frequency increases. Variable switching frequency control is generally seen as a drawback of a resonant converter, especially in an application with a wide input voltage range or a wide output voltage range (or both). In order to cover wide voltage conversion ratio range, the maximum switching frequency of a resonant converter increases so that driving, magnetic component, and switching turnoff losses increase. Therefore, it should be noted that research on methodology to widen the range of the voltage conversion ratio of a multi-phase resonant converter is essential for a high-power application with wide input voltage range or output voltage range (or both), such as high power EV charging application.

SUMMARY

In view of the above and other drawbacks, the present disclosure provides a multi-phase isolated resonant converter and a method for controlling the multi-phase isolated resonant converter so as to operate the multi-phase isolated resonant converter with a wide input-voltage range or a wide-output-voltage range (or both) by substantially reducing the switching frequency range. Reduction in the switching frequency range is achieved by controlling the multi-phase converter with a combination of switching frequency, duty ratio, and delay-time control. Switching frequency and duty ratio may be used to control primary side switches of a multi-phase resonant converter, while delay-time control may be used to control secondary side switches. The delay-time control of a secondary side switch may be implemented by delaying the turning-off of the corresponding secondary switch with respect to zero-crossing instant of the primary or secondary side current or with respect to the turning-off instant of the corresponding primary side switch. The delay-time control of the present disclosure can be extended to dual delay-time control with full bridge rectifier to achieve wider output voltage range. Also, the delay-time control of the present disclosure can be used for active current-sharing of each phase.

In one aspect, the present disclosure provides an isolated resonant converter, comprising: one or more phases, wherein each phase comprises a transformer, a set of resonant components, a set of primary side switches electrically coupling an input terminal to the transformer through the resonant components, and a set of secondary side switches electrically coupling the transformer to an output terminal; and a control circuit electrically coupled to said one or more phases, wherein the control circuit is configured to: detect an input voltage at the input terminal and an output voltage at the output terminal, determine first control signals for the primary side switches and second control signals for the secondary side switches, based on a plurality of parameters including physical properties of the resonant components, the input voltage, the output voltage, and a reference voltage, and transmit to the primary side switches the first control signals having a switching frequency and a first duty ratio, and transmit to the secondary side switches the second control signals having the switching frequency and a second duty ratio, wherein the second duty ratio for a first one of the secondary side switches is greater than the first duty ratio for a first corresponding one of the primary side switches.

In one embodiment, the second duty ratio for a second one of the secondary side switches is defined with respect to a turning off instant of a second corresponding one of the primary side switches.

In one embodiment, the control circuit is further configured to detect an electric current flowing through each of said one or more phases.

In one embodiment, the second duty ratio for a second one of the secondary side switches is defined with respect to a positive-to-negative or negative-to-positive zero crossing instant of the electric current.

In one embodiment, the control circuit comprises: a sensing and scaling circuit configured to receive the input and output voltages and to convert the input and output voltages into scaled input and output voltages; a subtractor circuit configured to receive the scaled output voltage and to generate an error signal by subtracting the scaled output voltage from the reference voltage; an error amplifier configured to receive the error signal and to generate an amplified and compensated error signal; a processor circuit configured to receive the scaled input voltage and the amplified and compensated error signal, and to generate the first and second control signals for the primary and secondary side switches based on the scaled input voltage and the amplified and compensated error signal.

In one embodiment, the control circuit further comprises a zero-current detector (ZCD) configured to detect an electric current signal flowing through each of said one or more phases.

In one embodiment, the processor circuit is further configured to receive the electric current signal and to generate the first and second control signals for the primary and secondary side switches based on the scaled input voltage, the amplified and compensated error signal, and the electric current signal.

In one embodiment, said one or more phases comprise at least two phases, and wherein the control circuit further comprises a current balancing circuit configured to modify the second control signals before being transmitted to the secondary side switches such that electric currents flowing through different ones of said at least two phases are balanced with each other.

In one embodiment, the current balancing circuit further comprises: a current sensing, scaling, and averaging circuit configured to obtain an averaged magnitude of the electric current flowing through each of said at least two phases; and a delay-time adder configured to determine a delay time for each of said at least two phases based on a difference of the electric currents between selected two of said at least two phases and to modify the second control signals by adding the delay time to a duty ratio of the second control signals.

In another aspect, the present disclosure provides a method for controlling an isolated resonant converter having one or more phases, wherein each phase comprises a transformer, a set of resonant components, a set of primary side switches electrically coupling an input terminal to the transformer through the resonant component, and a set of secondary side switches electrically coupling the transformer to an output terminal, the method comprising: detecting an input voltage at the input terminal of the isolated resonant converter and an output voltage at the output terminal of the isolated resonant converter; determining, from a plurality of parameters, first control signals for the primary side switches and second control signals for the secondary side switches, wherein the parameters comprise physical properties of the resonant components, the input voltage, the output voltage, and a reference voltage; transmitting to the primary side switches the first control signals having a switching frequency and a first duty ratio; and transmitting to the secondary side switches the second control signals having the switching frequency and a second duty ratio; wherein the second duty ratio for a first one of the secondary side switches is greater than the first duty ratio for a first corresponding one of the primary side switches.

In one embodiment, the second duty ratio for a second one of the secondary side switches is defined by a turning off instant of a second corresponding one of the primary side switches.

In one embodiment, the method further comprises detecting an electric current flowing through each of said one or more phases.

In one embodiment, the second duty ratio for a second one of the secondary side switches is defined by a positive-to-negative or negative-to-positive zero crossing instant of the electric current.

In one embodiment, the method further comprises modifying the second control signals before transmitting to the secondary side switches such that electric currents flowing through different ones of said phases are balanced with each other.

In still another aspect, the present disclosure provides an isolated resonant converter, comprising: a transformer; a set of resonant components; a primary side full bridge circuit having a first leg and a second leg electrically coupling an input terminal to the transformer through the resonant component; a secondary side full bridge circuit having a third leg and a fourth leg electrically coupling the transformer to an output terminal; and a control circuit electrically coupled to the first and second full bridge circuits, wherein the control circuit is configured to: detect an input voltage at the input terminal and an output voltage at the output terminal, determine control signals for the first, second, third, and fourth legs, based on an amplified and compensated error signal $V_{EA}$, wherein the control signals comprise duty ratios for at least one of the first, second, third, and fourth legs, and transmit the control signals to the primary and secondary side full bridge circuits; wherein the isolated resonant converter is a buck converter when the amplified and compensated error signal $V_{EA}$ is below a threshold value; and wherein the isolated resonant converter is a boost converter when the amplified and compensated error signal $V_{EA}$ is above the threshold value.

In one embodiment, when the amplified and compensated error signal $V_{EA}$ is below the threshold value, the duty ratio for the first leg between 0.0 to 0.5 and the duty ratio for the second leg is 0.0.

In one embodiment, when the amplified and compensated error signal $V_{EA}$ is below the threshold value, the duty ratio for the first leg is 0.5 and the duty ratio for the second leg is between 0 and 0.5.

In one embodiment, when the amplified and compensated error signal $V_{EA}$ is above the threshold value, the duty ratios for the first and second legs are 0.5, the duty ratio for the third leg is between 0.5 to 1.0 and the duty ratio for the fourth leg is 0.5.

In one embodiment, when the amplified and compensated error signal $V_{EA}$ is above the threshold value, the duty ratios for the first and second legs are 0.5, the duty ratio for the third leg is 1.0, and the duty ratio for the fourth leg is between 0.5 to 1.0.

In one embodiment, the duty ratios increase monotonously as the amplified and compensated error signal $V_{EA}$ increases.

In one embodiment, the duty ratios increase linearly as the amplified and compensated error signal $V_{EA}$ increases.

BRIEF DESCRIPTION OF THE DRAWINGS

FIGS. 3A through 3D illustrate an isolated multi-phase resonant converter in accordance with various embodiments of the present disclosure.

FIGS. 6A and 6B illustrate exemplary embodiments of an isolated multi-phase resonant converter with diode rectifiers at the secondary side.

FIGS. 7A and 7B illustrate exemplary embodiments of an isolated resonant converter with full bridge rectifiers at the secondary side.

DETAILED DESCRIPTION

FIGS. 3A through 3D illustrate an isolated multi-phase resonant converter 300 in accordance with various embodiments of the present disclosure. As shown in FIGS. 3A through 3D, converter 300 has N-phases, where N is a natural number (i.e., phase 1, phase 2, . . . , phase N), with primary side switches $Q_{P1}$, $Q_{P2}$, . . . , $Q_{P(2N)}$, secondary side switches $Q_{S1}$, $Q_{S2}$, . . . , $Q_{S(2N)}$, resonant capacitors $C_{P1}$, $C_{P2}$, . . . , $C_{PN}$ at the primary side, resonant inductors $L_{P1}$, $L_{P2}$, . . . , $L_{PN}$ at the primary side, transformers $T_{R1}$, $T_{R2}$, . . . , $T_{RN}$, resonant capacitors $C_{S1}$, $C_{S2}$, . . . , $C_{SN}$ at the secondary side, and an output filter capacitor $C_O$. In one embodiment, converter 300 has three phases (i.e., N=3).

Figure 3C:
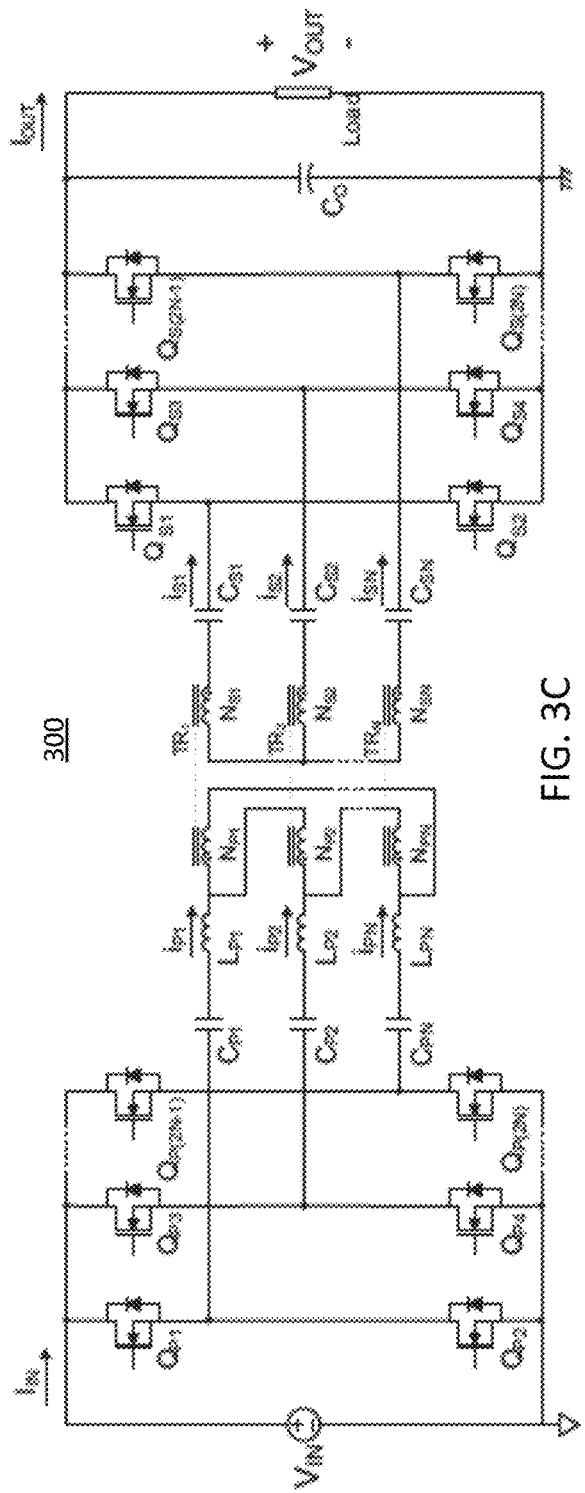
Figure 3D:
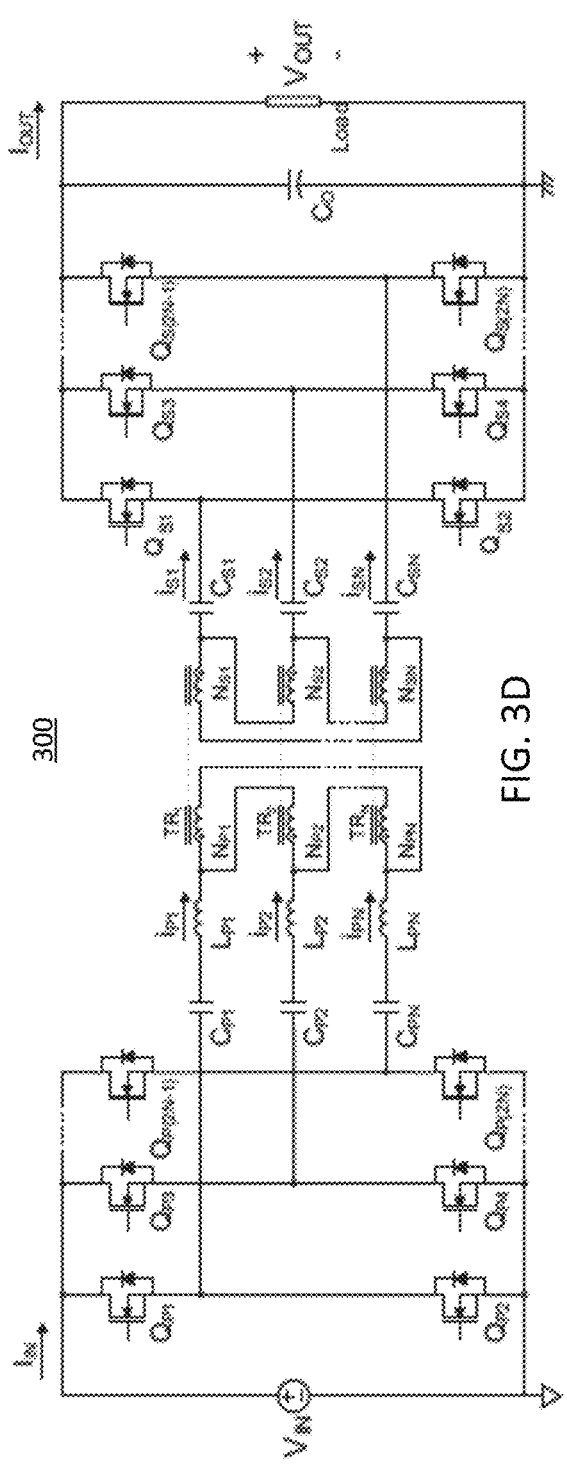

Referring to FIG. 3A, each phase of converter 300 includes two switches for a half bridge at the primary side, resonant-tank components, a transformer, and two switches for a half bridge at the secondary side. Transformers $T_{R1}$, $T_{R2}$, . . . , $T_{RN}$ have their primary side windings $N_{P1}$, $N_{P2}$, . . . , $N_{PN}$ at the primary side, and secondary side windings $N_{S1}$, $N_{S2}$, . . . , $N_{SN}$ at the secondary side. In this embodiment, one end of primary side windings $N_{P1}$, $N_{P2}$, . . . , $N_{PN}$ is connected to a single point (or a common node), while the other end of primary side windings $N_{P1}$, $N_{P2}$, . . . , $N_{PN}$ is connected to its corresponding half bridge. Likewise, one end of secondary side windings $N_{S1}$, $N_{S2}$, . . . , $N_{SN}$ is connected to a single point (or a common node), and the other end of secondary side windings $N_{S1}$, $N_{S2}$, . . . , $N_{SN}$ is connected to its corresponding half bridges. The connection configuration of transformers $T_{R1}$, $T_{R2}$, . . . , $T_{RN}$ in FIG. 3A is generally referred to as a Y-Y connection configuration. It is appreciated that transformers $T_{R1}$, $T_{R2}$, . . . , $T_{RN}$ can be coupled in any suitable connection configuration, such as, Y-Δ connection configuration (as shown in FIG. 3B), Δ-Y connection configuration (as shown in FIG. 3C), and Δ-Δ connection configuration (as shown in FIG. 3D). The control methods of the present disclosure are not substantively affected by the connection configuration of the transformers.

Figure 4A:
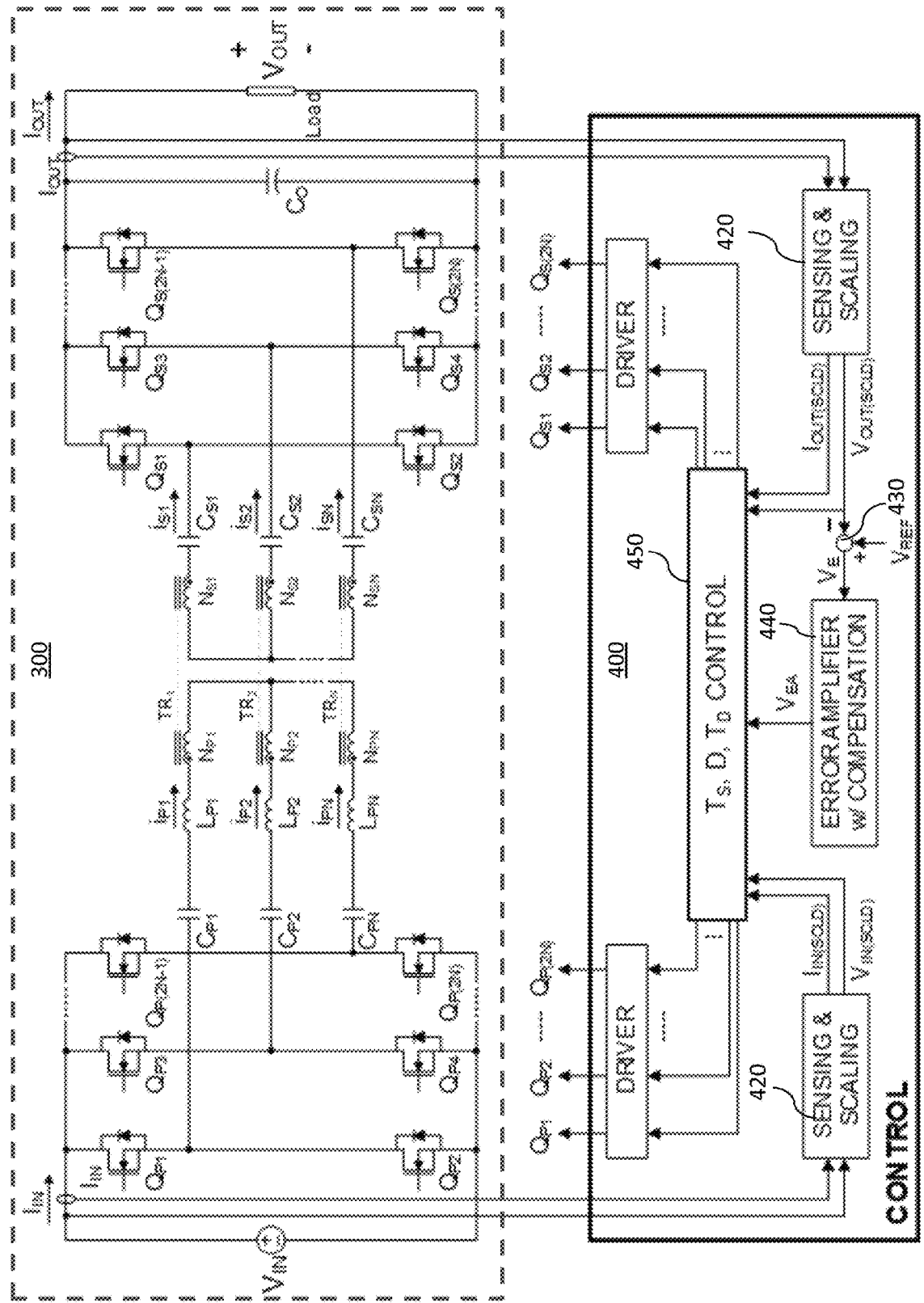
FIGS. 4A and 4B illustrate an isolated multi-phase series-resonant converter connected with a controller, in accordance with embodiments of the present disclosure.
Figure 4B:
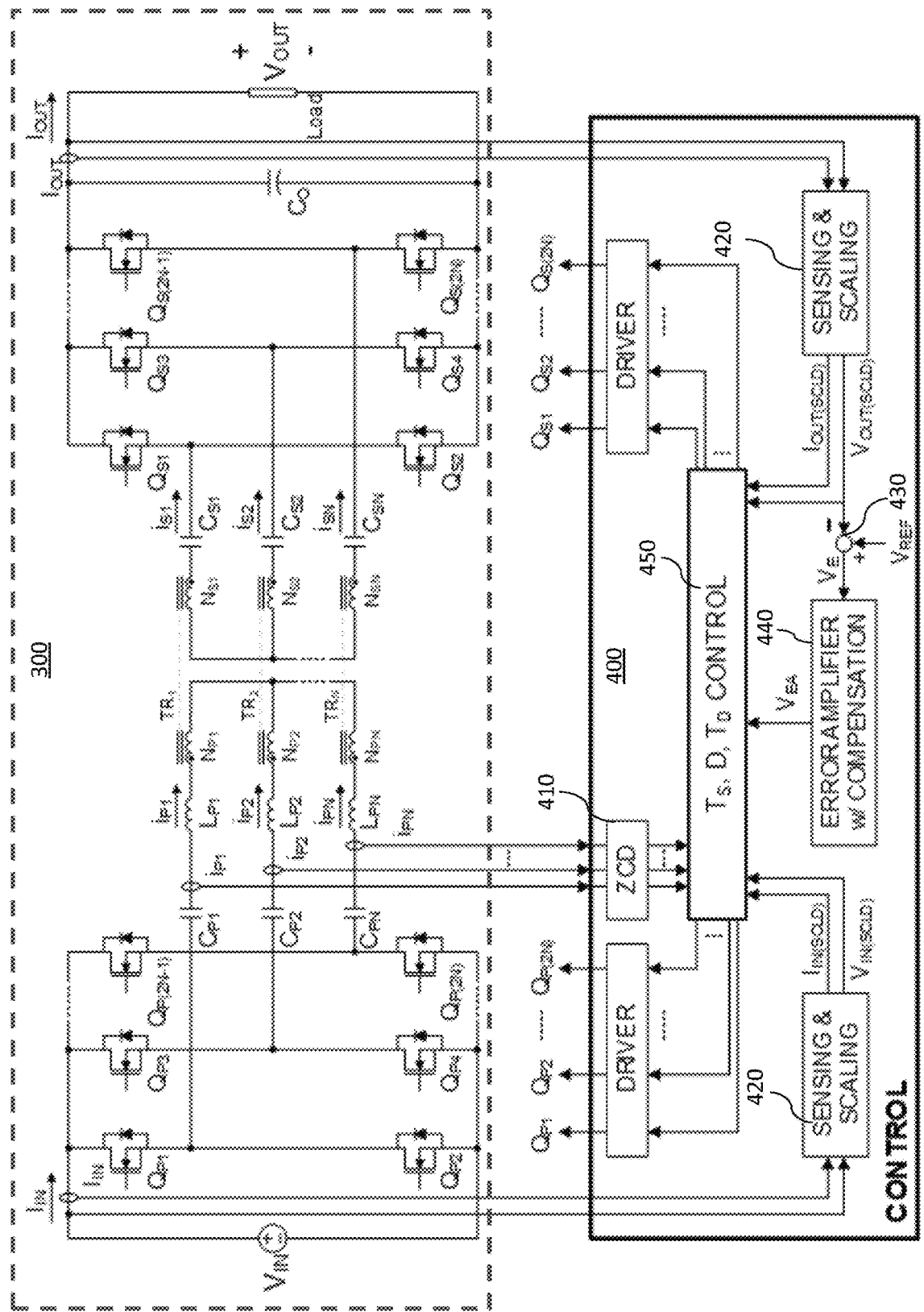

FIGS. 4A and 4B illustrate an isolated multi-phase series-resonant converter 300 connected with a controller 400, in accordance with embodiments of the present disclosure. Controller 400 in FIG. 4B is substantially the same as controller 400 in FIG. 4A, except that controller 400 in FIG. 4B additionally includes a zero-current detector (ZCD) 410. In one embodiment, controller 400 in both FIGS. 4A and 4B can control converter 300 using a combination of variable switching frequency ($f_S$=1/$T_S$) control, duty ratio (D) control, and delay-time ($T_D$) control. Specially, variable switching frequency control can be applied to both primary and secondary side switches $Q_{P1-P(2N)}$ and $Q_{S1-S(2N)}$; duty ratio control can be applied to primary side switches $Q_{P1-P(2N)}$; and delay-time control can be applied to secondary side switches $Q_{S1-S(2N)}$.

Figure 5A:
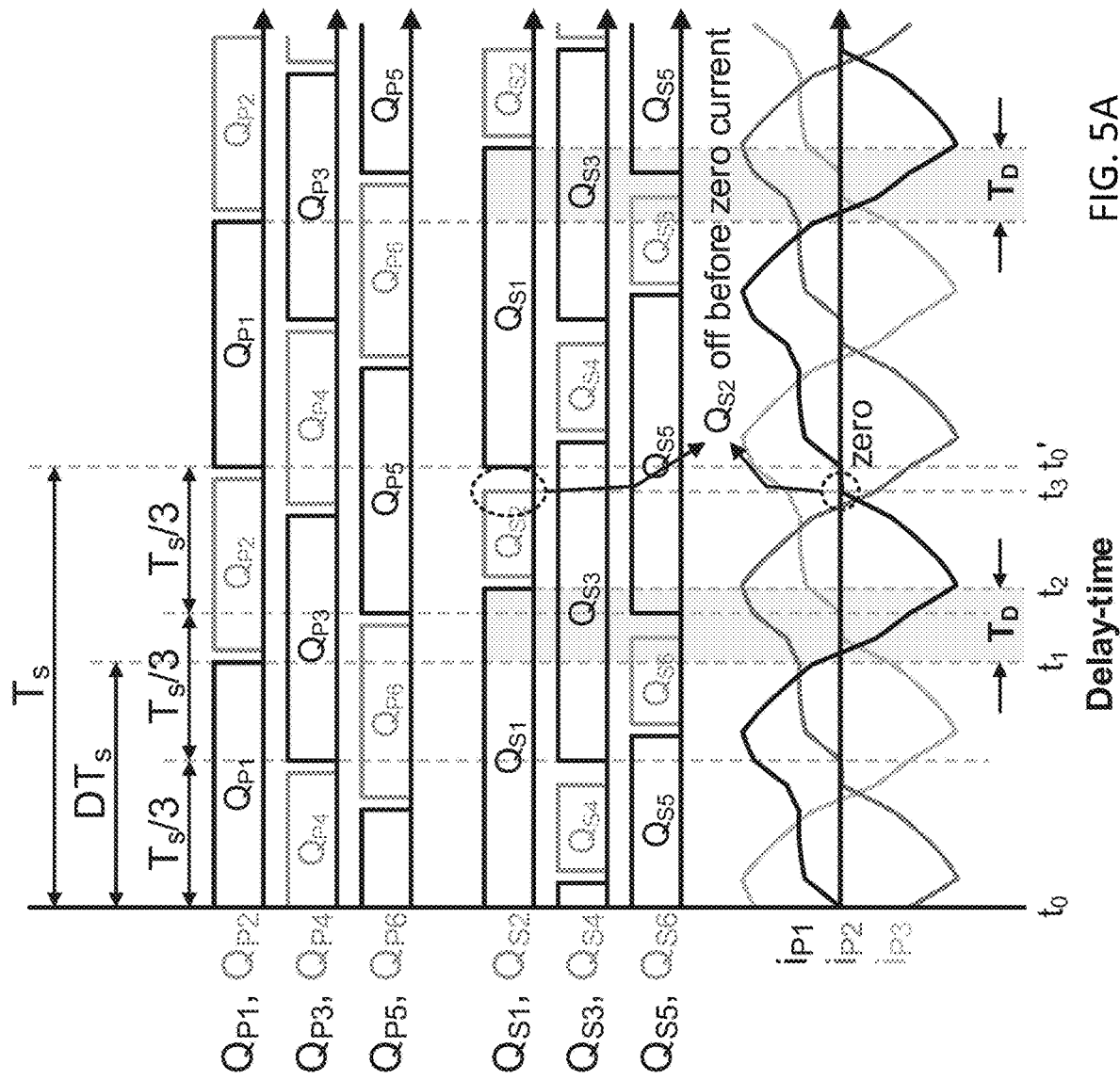
FIGS. 5A, 5B, 5C, and 5D illustrate exemplary waveforms of switch-control signals and primary side currents for controlling a three-phase converter, in accordance with an embodiment of the present disclosure.
Figure 5B:
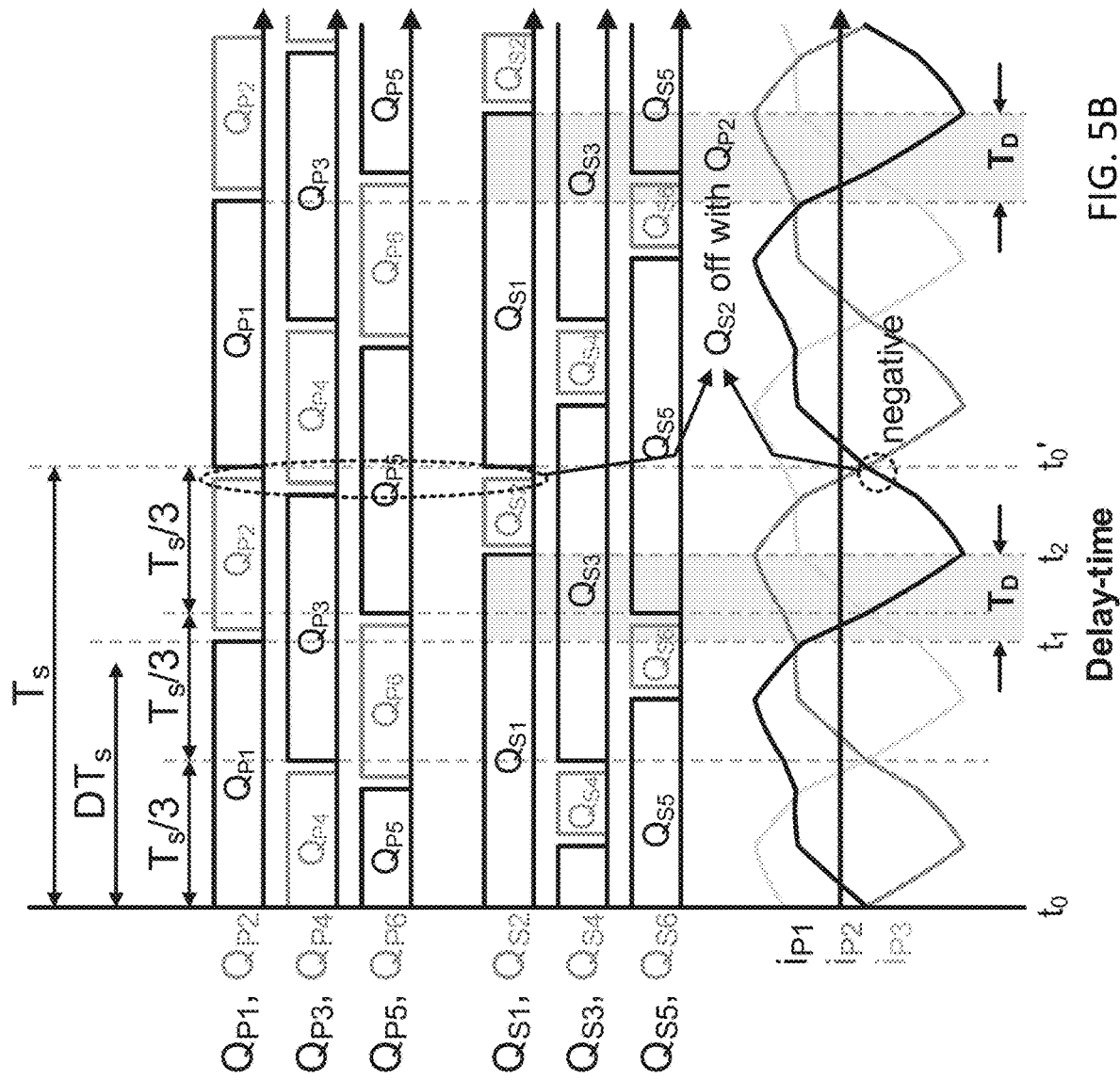
Figure 5C:
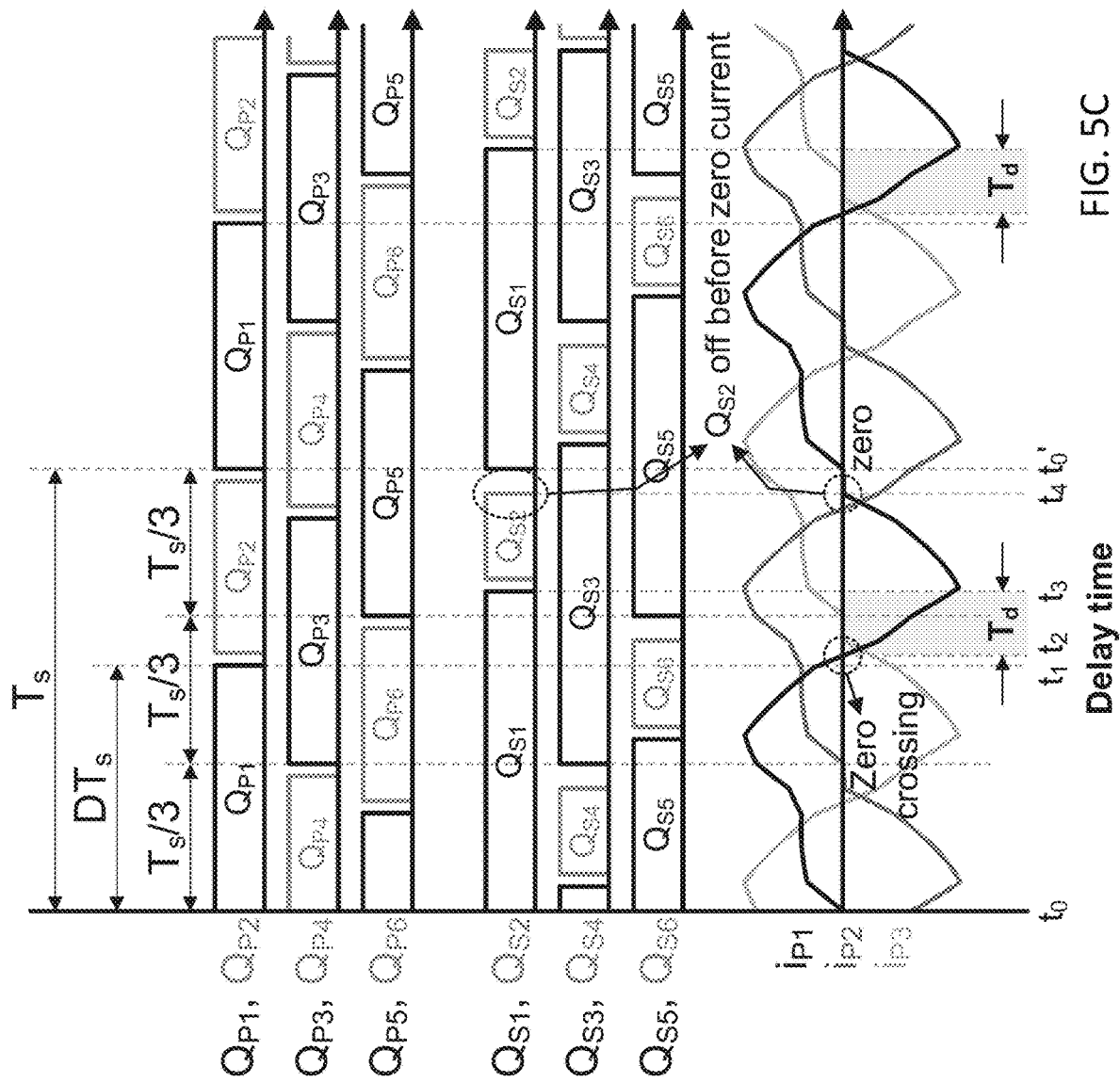
Figure 5D:
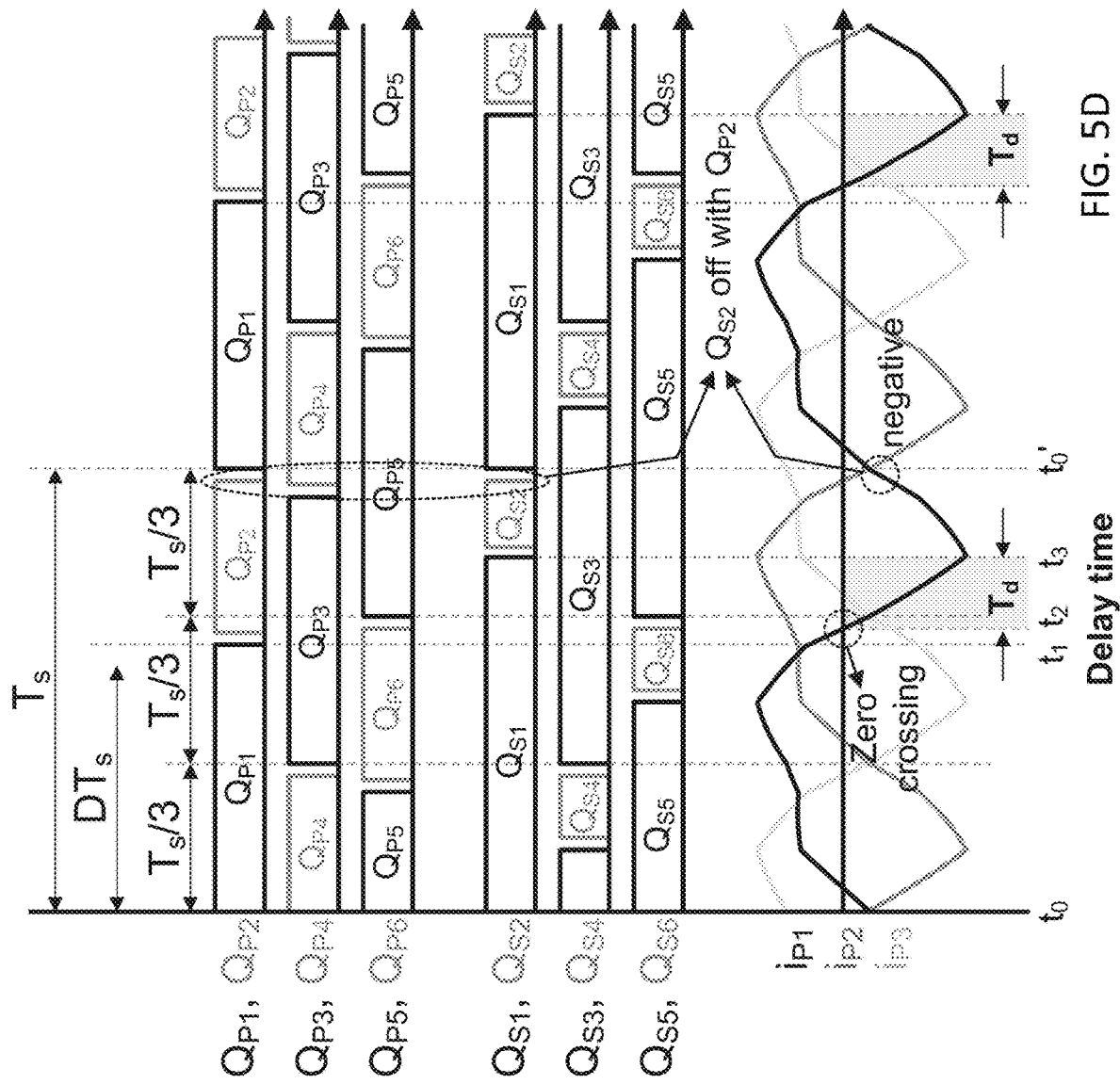

FIGS. 5A, 5B, 5C, and 5D illustrate exemplary waveforms of switch-control signals for primary side switches $Q_{P1}$, $Q_{P2}$, . . . , $Q_{P6}$ and secondary side switches $Q_{S1}$, $Q_{S2}$, . . . , $Q_{S6}$, as well as primary side currents $i_{P1}$, $i_{P2}$, and $i_{P3}$ for controlling converter 300 of FIG. 4B, when there are three phases (i.e., N=3), in accordance with an embodiment of the present disclosure. As shown in FIGS. 5A and 5B, all switches $Q_{P1-P6}$ and $Q_{S1-S6}$ operate at the same switching frequency $f_S$ (or period $T_S$=1/$f_s$). Primary side switches $Q_{P1-P6}$ operate with the duty ratio D (e.g., 50%). Delay-time $T_D$ (e.g., from $t_1$ to $t_2$) is utilized to control the turning-off instants of secondary side switches $Q_{S1}$, $Q_{S3}$, and $Q_{S5}$, with respect to the turning-off instants of primary side switches $Q_{P1}$, $Q_{P3}$, and $Q_{P5}$, respectively. Switch-control signals for each phase are shifted by about $T_S/3$ (or 120°). In the case of N phases, each phase may be shifted by about $T_S/N$. The turning-off instants of secondary side switches $Q_{S1}$, $Q_{S3}$, and $Q_{S5}$ can be determined with respect to the zero crossing instants of primary side currents, as shown in FIGS. 5C and 5D.

If zero current detector (ZCD) 410 is available in controller 400, as shown in FIG. 4B, the delay-time $T_D$ may be defined with respect to positive-to-negative zero crossing instant of the primary or secondary side current. It should be noted that the delay-time $T_D$ can be defined by the turning-off time difference between upper side switches $Q_{P1}$, $Q_{P3}$, and $Q_{P5}$ in the primary side and upper side switches $Q_{S1}$, $Q_{S3}$, and $Q_{S5}$ in the secondary side.

For example, as shown in FIGS. 5A and 5B, delay time $T_D$ is defined as the time period from $t_1$ (when upper side switch $Q_{P1}$ in the primary side is turned off) to t2 (when upper side switch $Q_{S1}$ in the secondary side is turned off). The same amount of delay time $T_D$ is used to delay the switching off time for upper side switches $Q_{S3}$ and $Q_{S5}$ in the secondary side with respect to the switching off time for upper side switches $Q_{P3}$ and $Q_{P5}$ in the primary side. Because the switching frequency is the same for all switches and because the control signals of the upper and lower switches are complementary, the delay time applied to upper side switches $Q_{S1}$, $Q_{S3}$, and $Q_{S5}$ suppresses or reduces the turning-on time for the lower side switches $Q_{S2}$, $Q_{S4}$, and $Q_{S6}$.

Waveforms in FIG. 5A can be applied to a light load condition, where lower side switch $Q_{S2}$, is turned off at the negative-to-positive zero crossing of primary side current $i_{P1}$, so as to pull charges out of output capacitor $C_O$ during $t_3$ to $t_0$. In contrast, waveforms in FIG. 5B can be applied to a heavy load condition. As shown in FIG. 5B, lower side switches $Q_{P2}$ and $Q_{S2}$ in the primary and second sides are turned off at the same time and thus synchronized. Likewise, lower switches $Q_{P4}$ and $Q_{S4}$ are turned off at the same time, while lower switches $Q_{P6}$ and $Q_{S6}$ are turned off at the same time and thus synchronized. If the delay-time $T_D$ is defined by the turning-off time difference between lower side switches $Q_{P2}$, $Q_{P4}$, and $Q_{P6}$ in the primary side and lower side switches $Q_{S2}$, $Q_{S4}$, and $Q_{S6}$ in the secondary side, the delay-time $T_D$ can be defined with respect to negative-to-positive zero crossing instant of the primary or secondary side current as shown in FIG. 5A or synchronized as shown in FIG. 5B.

Referring back to FIGS. 4A and 4B, a sensing and scaling circuit 420 of controller 400 receives output voltage $V_{OUT}$ from converter 300 and scales output voltage $V_{OUT}$ into a scaled output voltage $V_{O(SCLD)}$. A subtractor circuit 430 of controller 400 receives scaled output voltage $V_{O(SCLD)}$ and generates an error signal $V_E$ by subtracting scaled output voltage $V_{O(SCLD)}$ from a reference output voltage $V_{REF}$. An error amplifier 440 of controller 400 receives error signal $V_E$ and provides an amplified and compensated error signal $V_{EA}$ to a processor circuit 450, where switching frequency $f_S=1/T_S$, duty ratio D, and delay-time $T_D$ are determined.

Depending on the specific applications and/or implementations, input voltage $V_{IN}$, output voltage $V_{OUT}$, input current $I_{IN}$, or output current $I_{OUT}$ (or any combination thereof) may be sensed and scaled by sensing and scaling circuit 420, and provided to processor circuit 450. To achieve ZVS, a small dead-time is introduced between the turning-on instants and the turning-off instants of complementary switches. In various embodiments, zero current detector 410 may be used as shown in FIG. 4B to measure primary side currents $i_{P1}$, $i_{P2}$, and $i_{P3}$ and determine the time points where primary side currents $i_{P1}$, $i_{P2}$, and $i_{P3}$ are zero, thereby switching off secondary side switches $Q_{S2}$, $Q_{S4}$, and $Q_{S6}$ as shown in FIG. 5A.

Figure 1A:
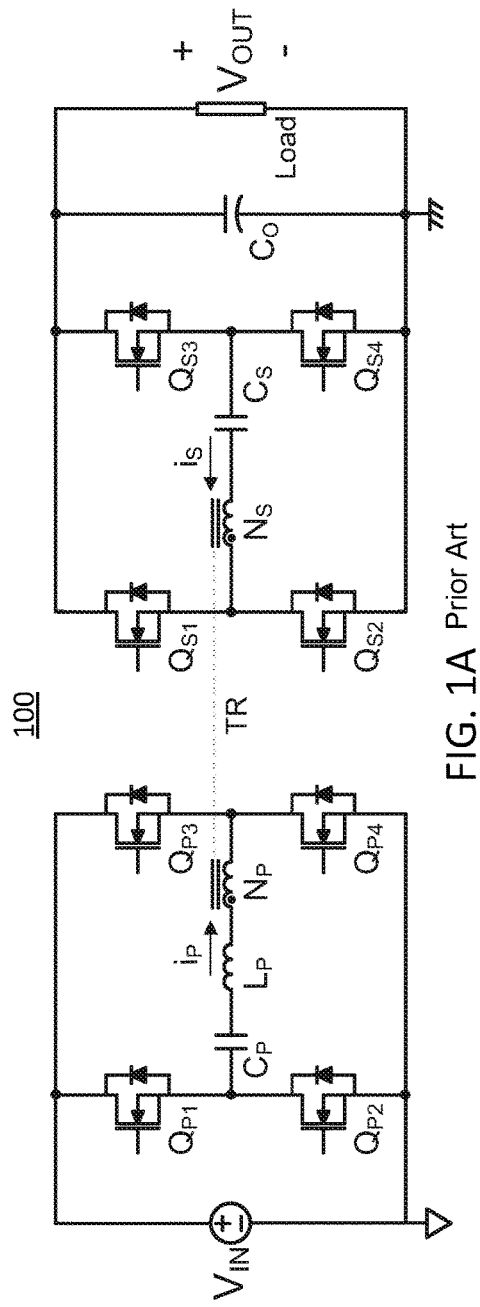
FIGS. 1A and 1B respectively illustrate a typical full-bridge topology for an isolated resonant power converter and its timing diagrams of switch-control signals for ZVS operation.
Figure 1B:
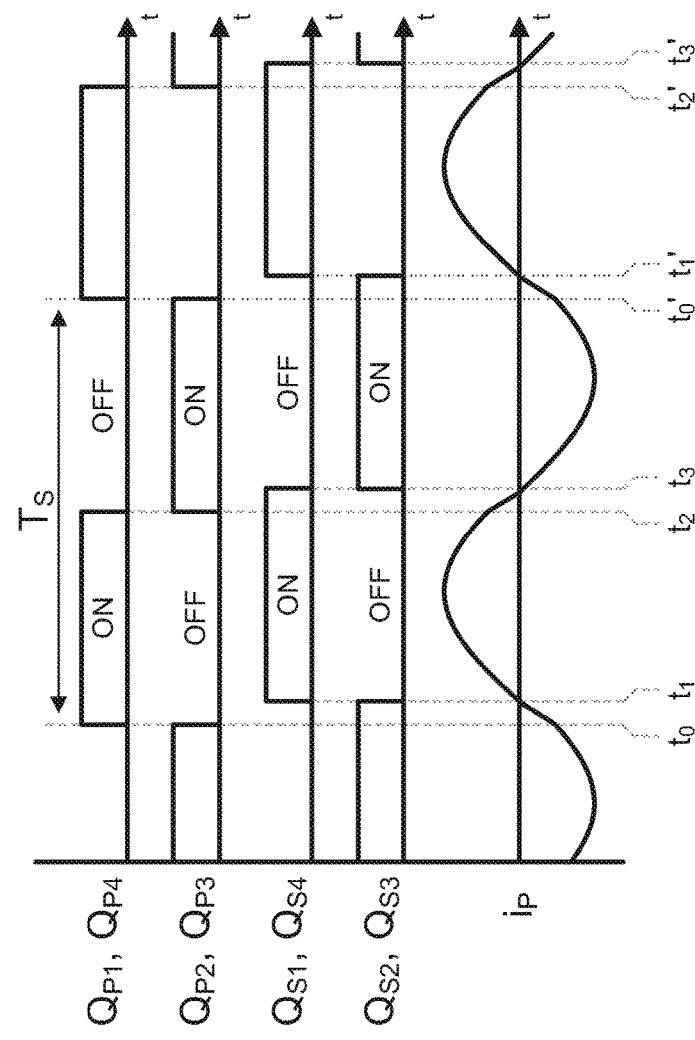
Figure 2A:
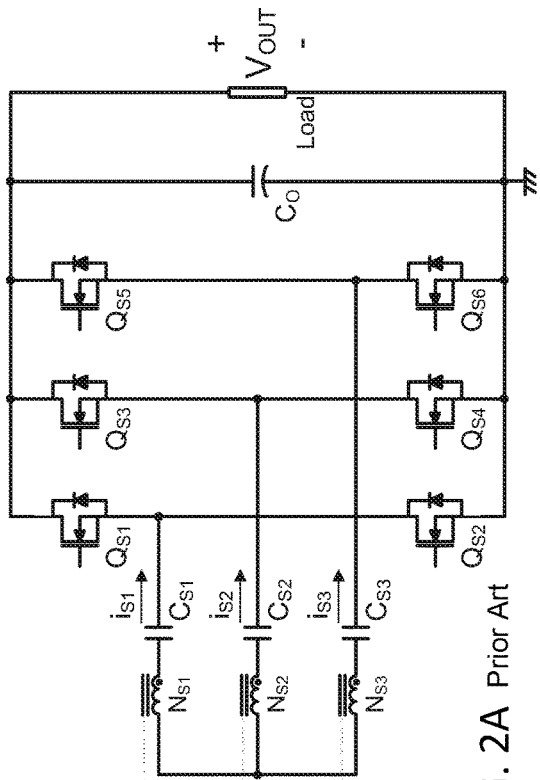
FIGS. 2A and 2B respectively illustrate a typical three-phase isolated series-resonant converter and its timing diagrams of switch-control signals for ZVS operation.
Figure 2B:
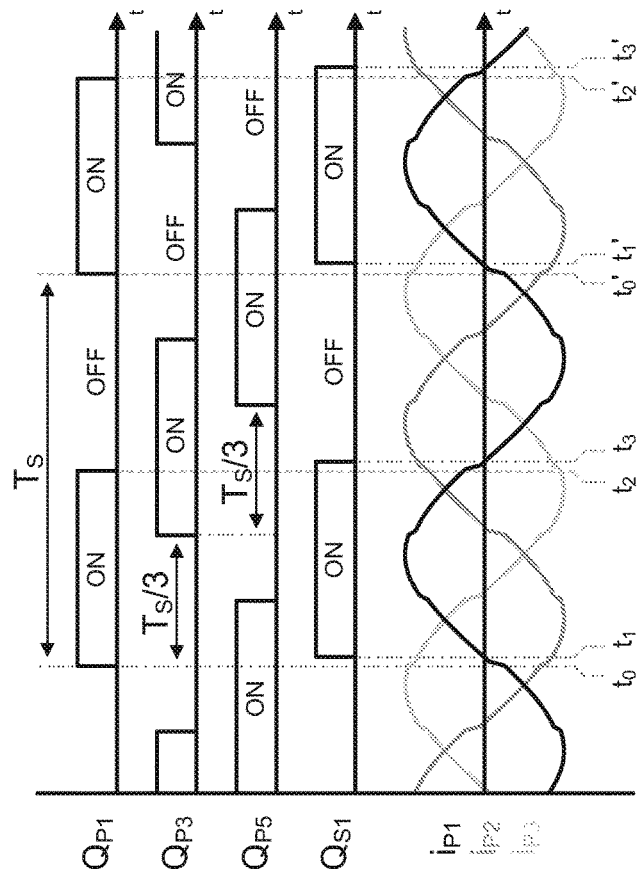

Delay-time control allows a resonant converter to provide step-up voltage conversion ratio to the resonant converter, whereas the conventional variable switching frequency control provides only step-down voltage conversion ratio in the series resonant converter. Specifically, as shown in FIGS. 1B and 2B, when a conventional series resonant converter operates without delay-time control, the resonant tank components and the transformer are always located between the input voltage source and the output voltage capacitor. The voltage across the resonant-tank components and transformer effectively becomes $V_{IN}$-$V_{OUT}$. If we assume that the output voltage is greater than the input voltage, the resonant inductor current cannot be built up. For these reasons, conventional series resonant converters can only provide step-down voltage conversion ratio.

In contrast, as shown in FIGS. 5A and 5B, when the delay-time control is applied, the resonant-tank components and the transformer are separated from the output voltage capacitor during delay-time $T_D$ defined as, for example, the time interval between $t_1$ and $t_2$. The voltage across the resonant-tank components and the transformer effectively becomes —$V_{IN}$-$V_{OUT}$ during delay-time $T_D$, so that the resonant inductor current can be built up much faster than conventional control. Since both $V_{IN}$ and $V_{OUT}$ contribute to build the resonant inductor current in the same direction, the resonant inductor current can be built up regardless of the output voltage. Therefore, the delay-time control can provide output current when the output voltage is higher than the input voltage, thereby resulting in the step-up voltage conversion ratio capability.

Without delay-time control, conventional variable switching frequency control should cover the entire range of voltage conversion ratio. In an application with a wide voltage conversion ratio range, the range of switching frequency becomes wide because the voltage conversion ratio varies according to the switching frequency. Wide switching frequency range causes large driving loss, switching loss, and difficulties in optimizing magnetic components.

Compared with the step-up voltage conversion ratio capability of the delay-time control, the conventional variable switching frequency control covers narrower voltage conversion ratio range. Therefore, the aid of the delay-time control allows reduced driving loss, switching loss, and advantageous design in magnetic components.

The control methods of the present disclosure are also applicable to multi-phase resonant converters that implement secondary side rectifier with a combination of diodes and controllable switches as shown in FIGS. 6A and 6B. For example, the upper side switches in the secondary side rectifier $Q_{S1}$, $Q_{S3}$, ..., $Q_{S(2N-1)}$ in FIG. 3A can operate as a diode rectifier. Therefore, these upper side switches can be replaced with diodes, as shown in FIG. 6A. Likewise, the lower side switches in the secondary side rectifier $Q_{S2}$, $Q_{S4}$, ..., $Q_{S(2N)}$ in FIG. 3A can be replaced with diodes as shown in FIG. 6B. It is appreciated that the converters in FIGS. 6A and 6B are unidirectional.

In certain embodiments, the control methods of the present disclosure can be extended to multi-phase or single-phase resonant converters with full-bridge rectifiers. By having full bridge rectifier at the secondary side, dual delay-time control can be applied to each phase of multi-phase resonant converters. Because of higher degree of freedom, the voltage conversion ratio of the resonant converters can be extended further.

Figure 8A:
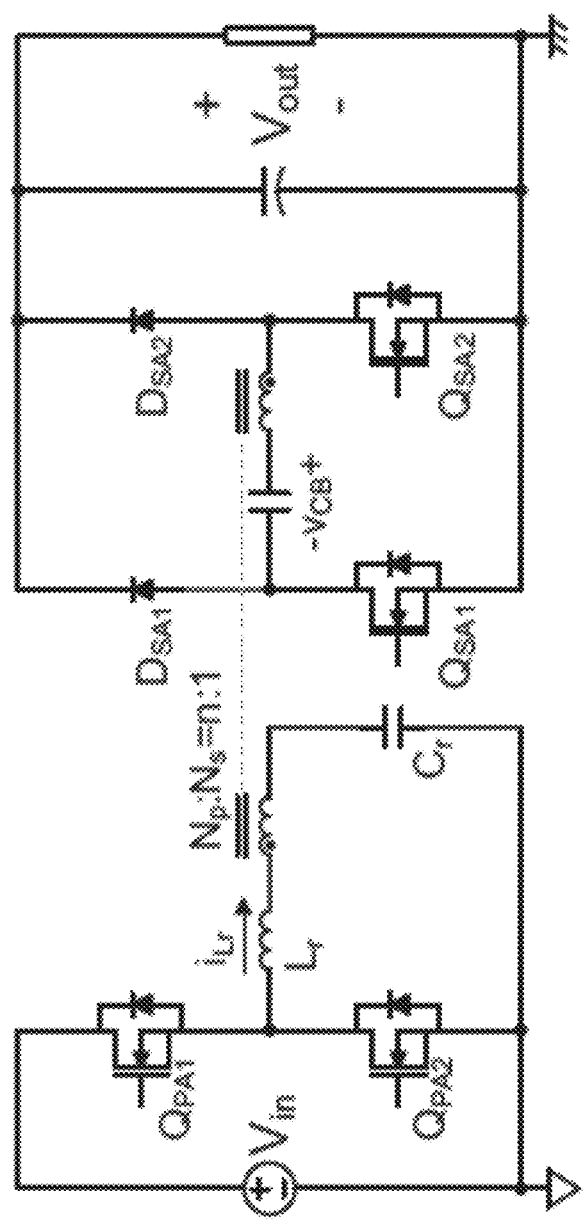
FIGS. 8A and 8B illustrate a single-phase resonant converter, in accordance with an embodiment of the present disclosure.
Figure 8B:
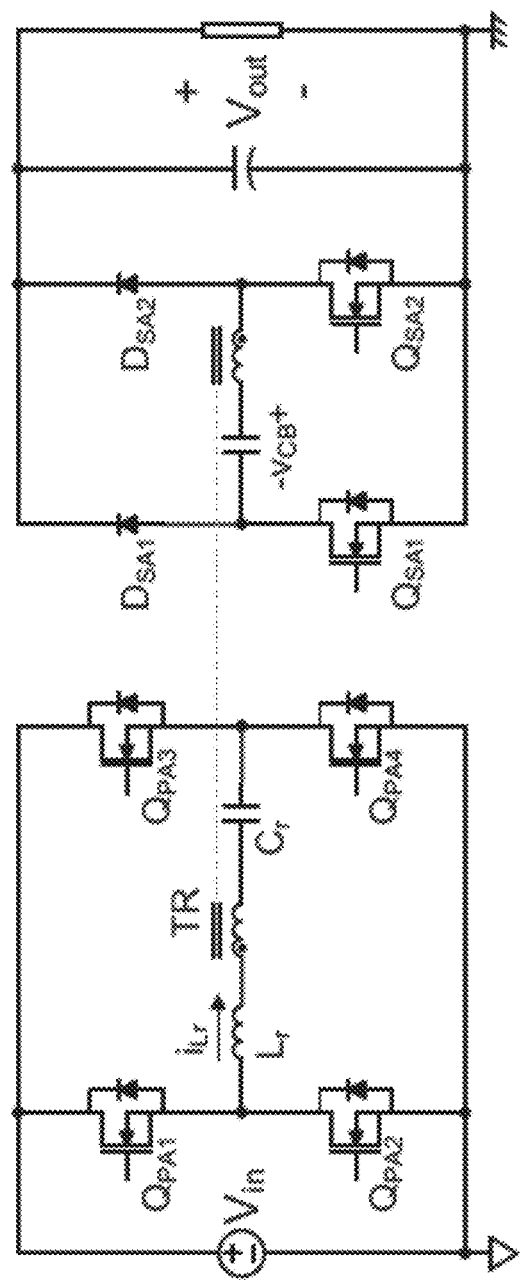

FIGS. 7A and 7B illustrate embodiments of an isolated three-phase resonant converter. As shown in FIG. 7A, transformers at the primary side are connected in a Y connection configuration. At the secondary side, transformer windings are not connected to each other for forming independent full bridge rectifiers. As shown in FIG. 7B, transformers at the primary side are connected in a Δ connection configuration. Converters in FIGS. 7A and 7B can be extended to multi-phase converters, and can also be bi-directional by replacing diodes $D_{SA1}$, $D_{SA2}$, $D_{SB1}$, $D_{SB2}$, $D_{SC1}$, and $D_{SC2}$ with switches. The dual delay-time control can also be applied to a single-phase resonant converter as shown in FIGS. 8A and 8B, which will be described in further detail below.

Figure 9A:
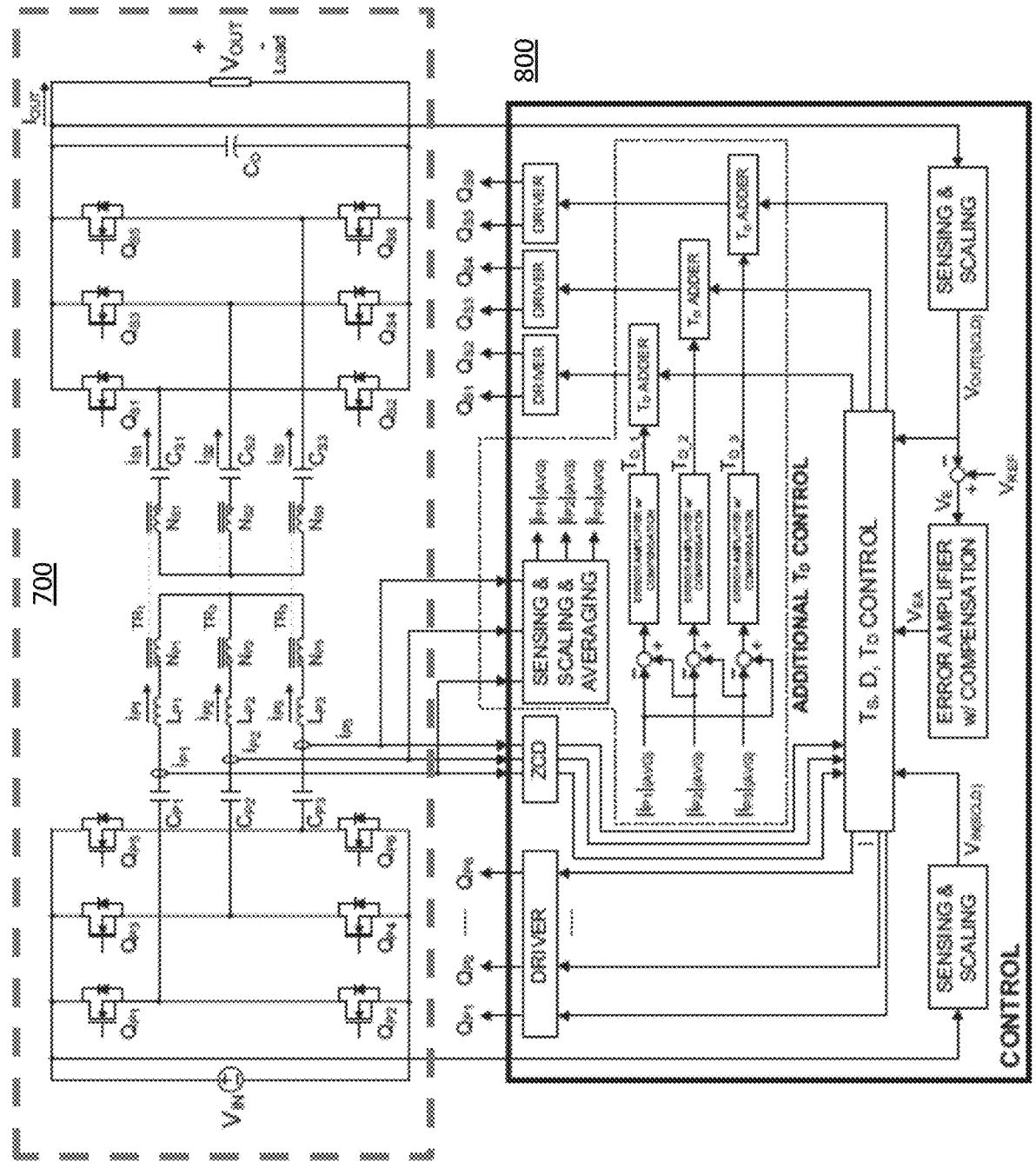
FIG. 9A illustrates an isolated multi-phase resonant converter coupled with a controller for active current-sharing in the converter, in accordance with an embodiment of the present disclosure.
Figure 9B:
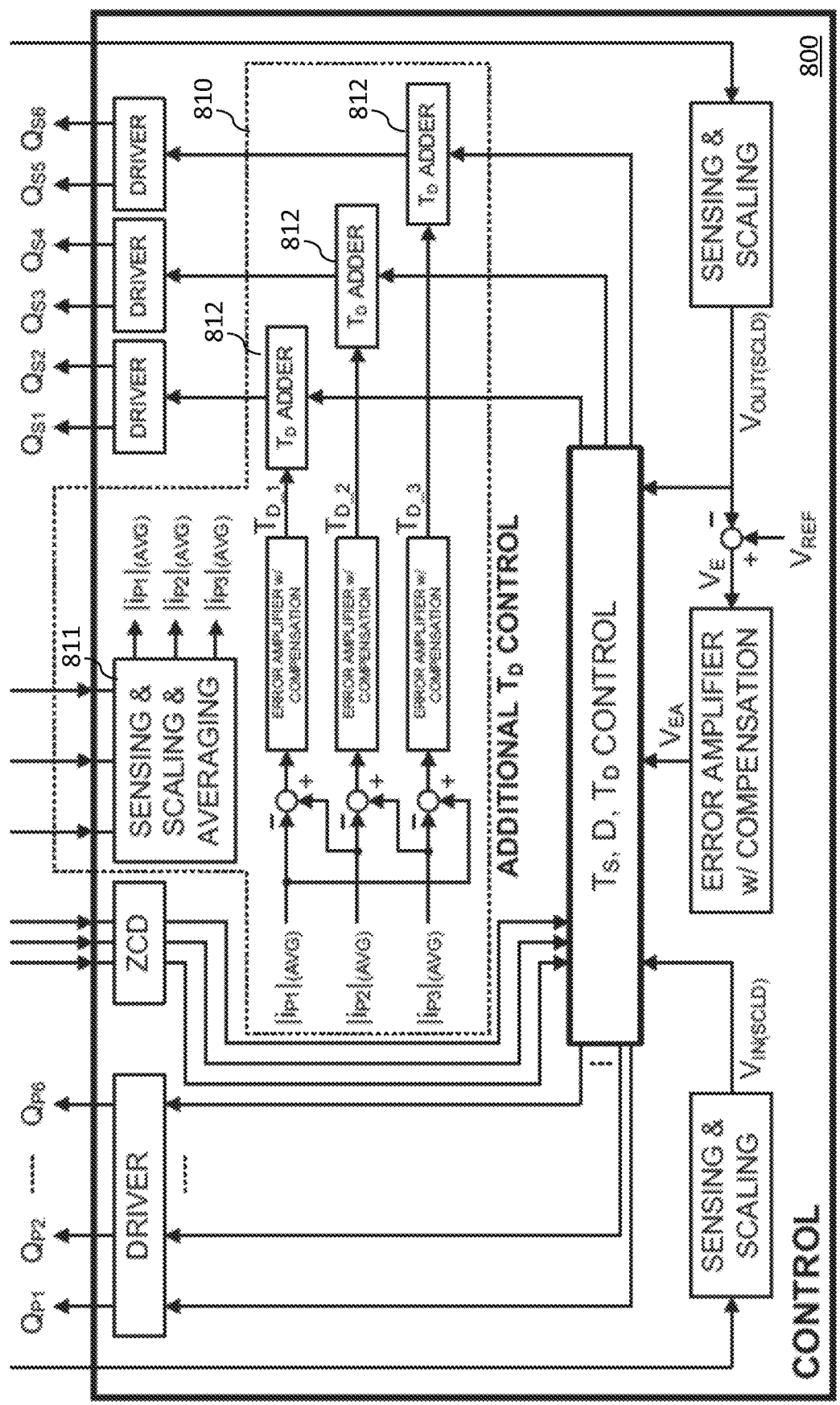
FIG. 9B illustrates an enlarged view of the controller in FIG. 9A.

The delay-time control of the present disclosure may also be used to control active current-sharing in multi-phase resonant converters to balance out the magnitudes of currents in each phase. FIG. 9A illustrates an isolated multi-phase resonant converter 700 connected coupled with a controller 800 for active current-sharing in converter 700, in accordance with an embodiment of the present disclosure. FIG. 9B illustrates an enlarged view of controller 800 in FIG. 9A.

As shown in FIGS. 9A and 9B, to balance out the magnitudes of currents in each phase, additional delay-time control is applied to each phase using a current balancing circuit 810 of controller 800. Each of phase currents $i_{P1}$, $i_{P2}$, and $i_{P3}$ is sensed, scaled, and averaged in a current sensing, scaling, and averaging circuit 811 of current balancing circuit 810 to obtain the magnitudes of currents in each phase $|i_{P1}|_{(AVG)}$, $|i_{P2}|_{(AVG)}$, and $|i_{P3}|_{(AVG)}$. Based on the current difference between any two of the three phases, additional delay-time is determined and added to the common delay-time $T_D$ by using one or more delay-time adders 812. The summed delay-time is applied to the corresponding leg at the secondary side. For the first phase corresponding to $Q_{S1}$ and $Q_{S2}$, additional delay-time $T_{D\_1}$ is added to delay time $T_D$ to balance out $|i_{P1}|_{(AVG)}$ and $|i_{P2}|_{(AVG)}$. Additional delay time $T_{D\_1}$ is provided from an error amplifier with compensation of the error signal, which is produced by subtracting $|i_{P1}|_{(AVG)}$ from $|i_{P2}|_{(AVG)}$. By doing so, $|i_{P1}|_{(AVG)}$ and $|i_{P2}|_{(AVG)}$ are balanced by $T_{D\_1}$. For the second phase, $|i_{P2}|_{(AVG)}$ and $|i_{P3}|_{(AVG)}$ are balanced in the same manner. Finally, for the third phase, $|i_{P3}|_{(AVG)}$ and $|i_{P1}|_{(AVG)}$ are also balanced in the same manner. Because all $|i_{P1}|_{(AVG)}$, $|i_{P2}|_{(AVG)}$, and $|i_{P3}|_{(AVG)}$ are balanced with each other, three-phase resonant converter 700 can achieve the active current-sharing.

Figure 10:
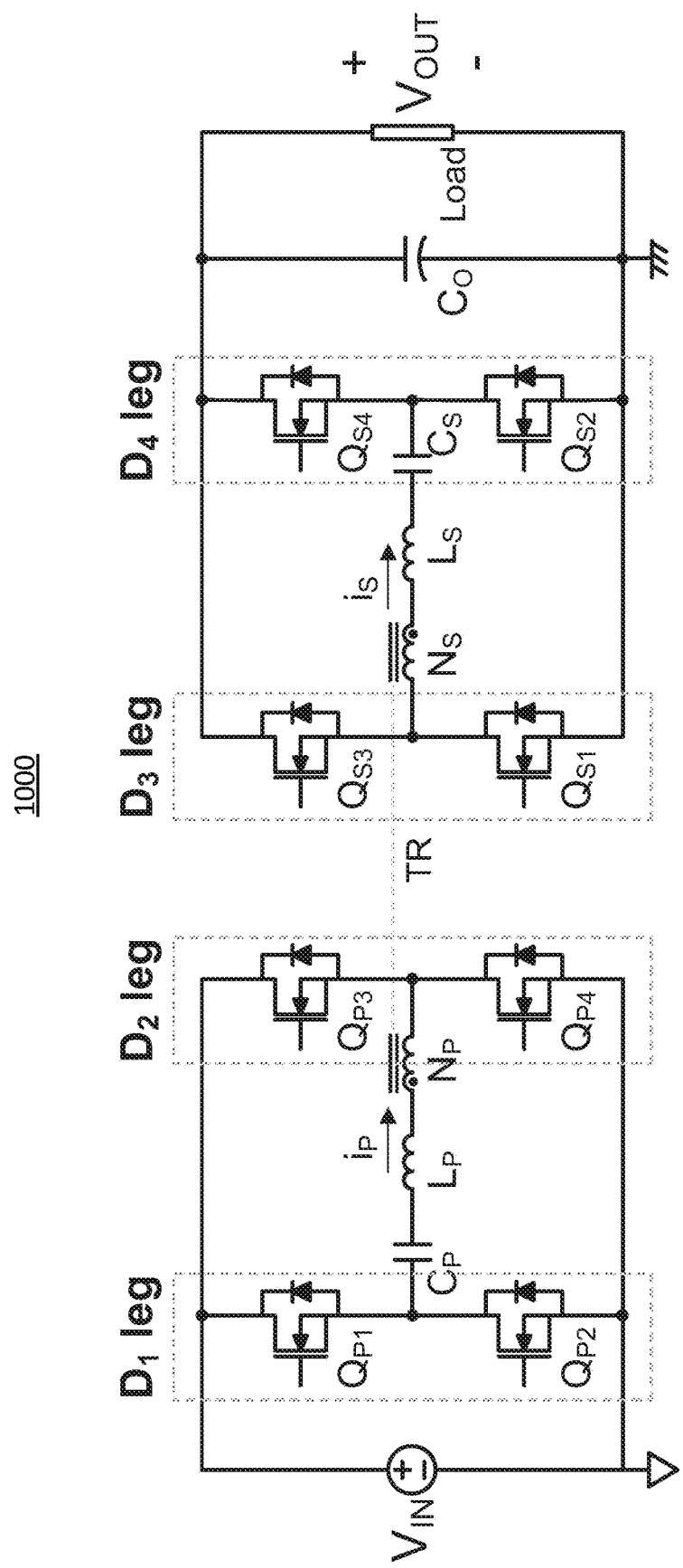
FIG. 10 illustrates a single-phase isolated series resonant converter with a full bridge configuration at both primary and secondary sides, in accordance with an embodiment of the present disclosure.
Figure 11:
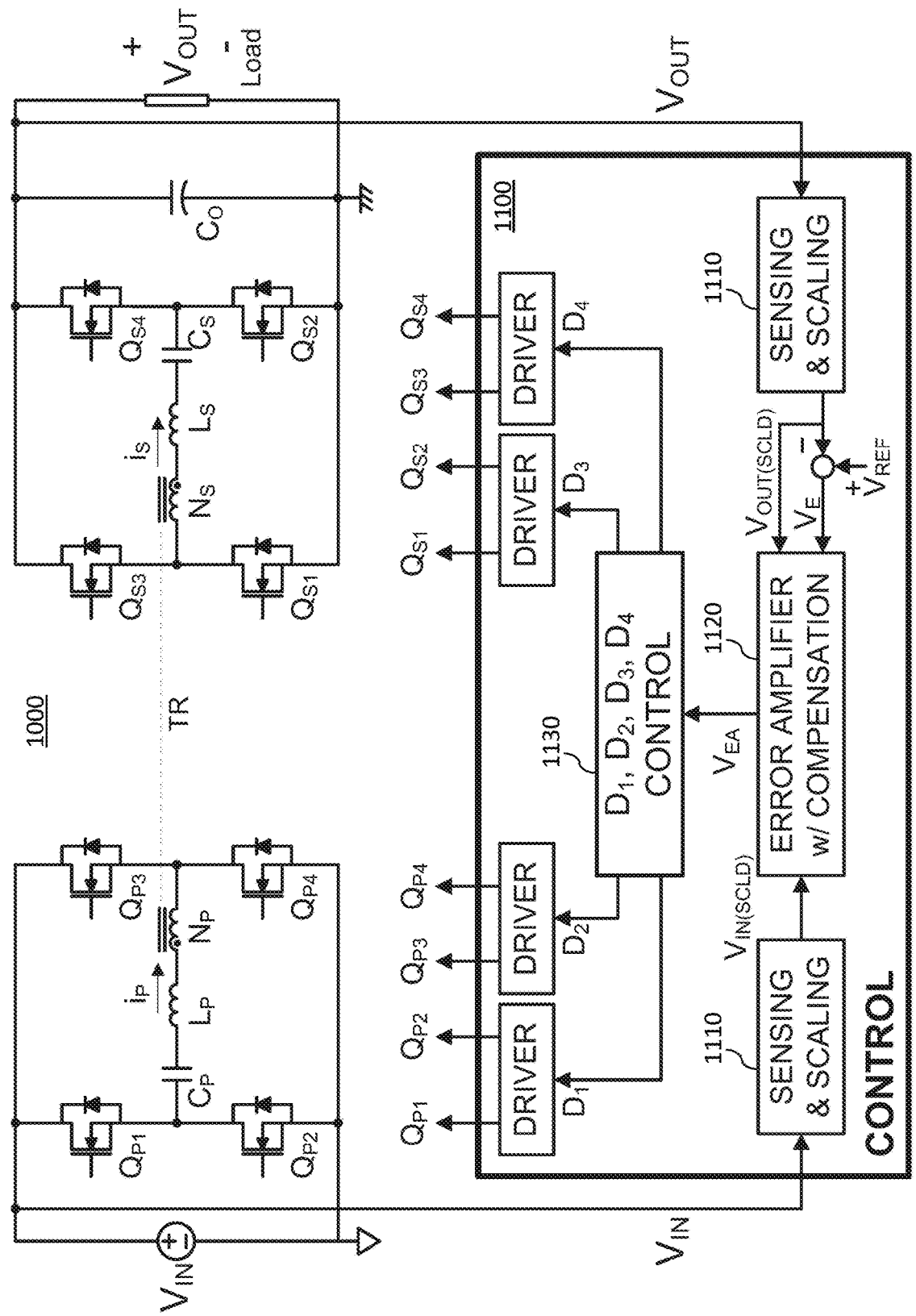
FIG. 11 illustrates the single-phase isolated series resonant converter of FIG. 10 coupled with a controller circuit, in accordance with an embodiment of the present disclosure.

FIG. 10 illustrates a single-phase isolated series resonant converter 1000 with a full bridge configuration at both primary and secondary sides, in accordance with an embodiment of the present disclosure. FIG. 11 illustrates the single-phase isolated series resonant converter 1000 of FIG. 10 coupled with a controller circuit 1100, in accordance with an embodiment of the present disclosure. As shown in FIGS. 10 and 11, converter 1000 includes primary side switches $Q_{P1}$, $Q_{P2}$, $Q_{P3}$, $Q_{P4}$, secondary side switches $Q_{S1}$, $Q_{S2}$, $Q_{S3}$, $Q_{S4}$, a resonant capacitor $C_P$ in the primary side, a transformer TR, a resonant inductor $L_P$ in the secondary side, a resonant capacitor $C_S$ in the secondary side, a resonant inductor $L_S$ in the secondary side, and an output filter capacitor $C_O$. Primary side switches $Q_{P1}$ and $Q_{P2}$ form a half bridge leg $D_1$. Primary side switches $Q_{P3}$ and $Q_{P4}$ form a half bridge leg $D_2$. Secondary side switches $Q_{S1}$ and $Q_{S3}$ form a half bridge leg $D_3$. Secondary side switches $Q_{S2}$ and $Q_{S4}$ form a half bridge leg $D_4$.

Referring to both FIGS. 10 and 11, input voltage $V_{IN}$ and output voltage $V_{OUT}$ may be sensed and scaled to $V_{IN(SCLD)}$ and $V_{OUT(SCLD)}$, respectively, in a sensing and scaling circuit 1110. $V_{OUT(SCLD)}$ is subtracted from a reference voltage $V_{REF}$ to produce error signal $V_E$. (i.e., $V_E = V_{REF} - V_{OUT(SCLD)}$). $V_E$ is then fed to an error amplifier with compensation 1120 to produce amplified error signal $V_{EA}$. $V_{IN(SCLD)}$ and $V_{OUT(SCLD)}$ can also be fed to error amplifier with compensation 1120 and be used for feedforward of error amplifier output signal $V_{EA}$. If necessary, input current or output current of the converter 1000 can be further sensed for $V_{EA}$ determination. $V_{EA}$ is fed to a leg controller 1130. The leg controller 1130 translates $V_{EA}$ to four duty cycle signals $D_1$, $D_2$, $D_3$, and $D_4$. Duty cycle signal $D_1$ determines duty cycle of switch $Q_{P1}$, while control signal for switch $Q_{P2}$ is complementary with the control signal for switch $Q_{P1}$. Duty cycle signal $D_2$ determines duty cycle of switch $Q_{P3}$, while, control signal for switch $Q_{P4}$ is complementary with the control signal for switch $Q_{P3}$. Duty cycle signal $D_3$ determines the duty cycle for switch $Q_{S1}$, while control signal for switch $Q_{S3}$ is determined so that switch $Q_{S3}$ can act as a synchronous rectifier. Duty cycle signal $D_4$ determines the duty cycle for switch $Q_{S2}$, while control signals for $Q_{S4}$ is determined so that switch $Q_{S4}$ can act as a synchronous rectifier.

Figure 12:
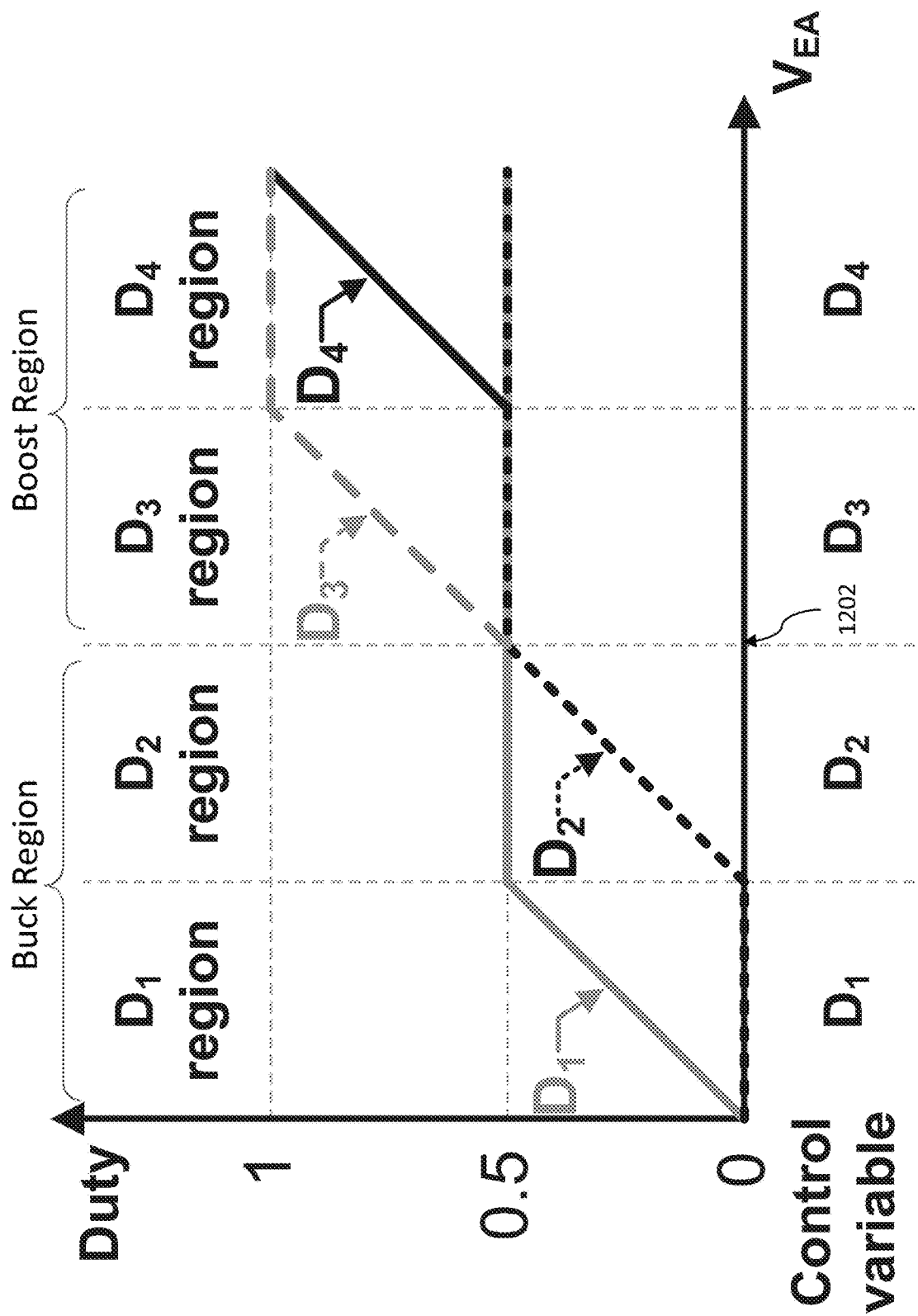
FIG. 12 illustrates an exemplary diagram that represents the relationship between $V_{EA}$ and duty cycle signals $D_1$, $D_2$, $D_3$, and $D_4$, in accordance with an embodiment of the present disclosure.

FIG. 12 illustrates an exemplary diagram that represents the relationship between $V_{EA}$ and duty cycle signals $D_1$, $D_2$, $D_3$, and $D_4$ in accordance with an embodiment of the present disclosure. In order to provide continuous voltage conversion ratio over a wide range, at least one duty cycle needs to be changed as $V_{EA}$ varies. In this example, as $V_{EA}$ increases from zero, duty cycle signal $D_1$ increases linearly from zero to 0.5. It is appreciated that duty cycle signal $D_1$ can increase nonlinearly. The main control variable becomes duty cycle signal $D_1$ so that the region is called $D_1$ region, where change in $V_{EA}$ leads to changes in duty cycle signal $D_1$. After duty cycle signal $D_1$ reaches 0.5, duty cycle signal $D_1$ remains at 0.5 and duty cycle signal $D_2$ increases linearly from zero to 0.5. It is appreciated that duty cycle signal $D_2$ can increase nonlinearly so long as such increase is monotonous. The region is called $D_2$ region, where change in $V_{EA}$ leads to changes in duty cycle signal $D_2$. In the $D_1$ and $D_2$ regions, converter 1000 is a buck converter because output voltage $V_{OUT}$ is less than input voltage $V_{IN}$. When both duty cycle signals $D_1$ and $D_2$ reaches 0.5, input voltage $V_{IN}$ is equal to out voltage $V_{OUT}$. Accordingly, the $D_1$ and $D_2$ regions can also be referred to as a "buck region."

After duty cycle signal $D_2$ reaches 0.5 at transition point 1202, converter 1000 becomes a boost converter as $V_{EA}$ further increases. Duty cycle signals $D_1$ and $D_2$ remain at 0.5 and duty cycle signal $D_3$ increases from 0.5 to 1.0. The region is called $D_3$ region, where change in $V_{EA}$ leads to changes in $D_3$. After duty cycle signal $D_3$ reaches 1.0, duty cycle signals $D_1$ and $D_2$ remain at 0.5, while duty cycle signal $D_3$ remains at 1.0, and $D_4$ increases from 0.5. The region is called $D_4$ region, where change in $V_{EA}$ leads to changes in duty cycle signal $D_4$. Converter 1000 operated in the $D_3$ and $D_4$ regions is a boost converter, because output voltage $V_{OUT}$ is greater than input voltage $V_{IN}$. Accordingly, the $D_3$ and $D_4$ regions can be also referred to as a "boost region."

Figure 13A:
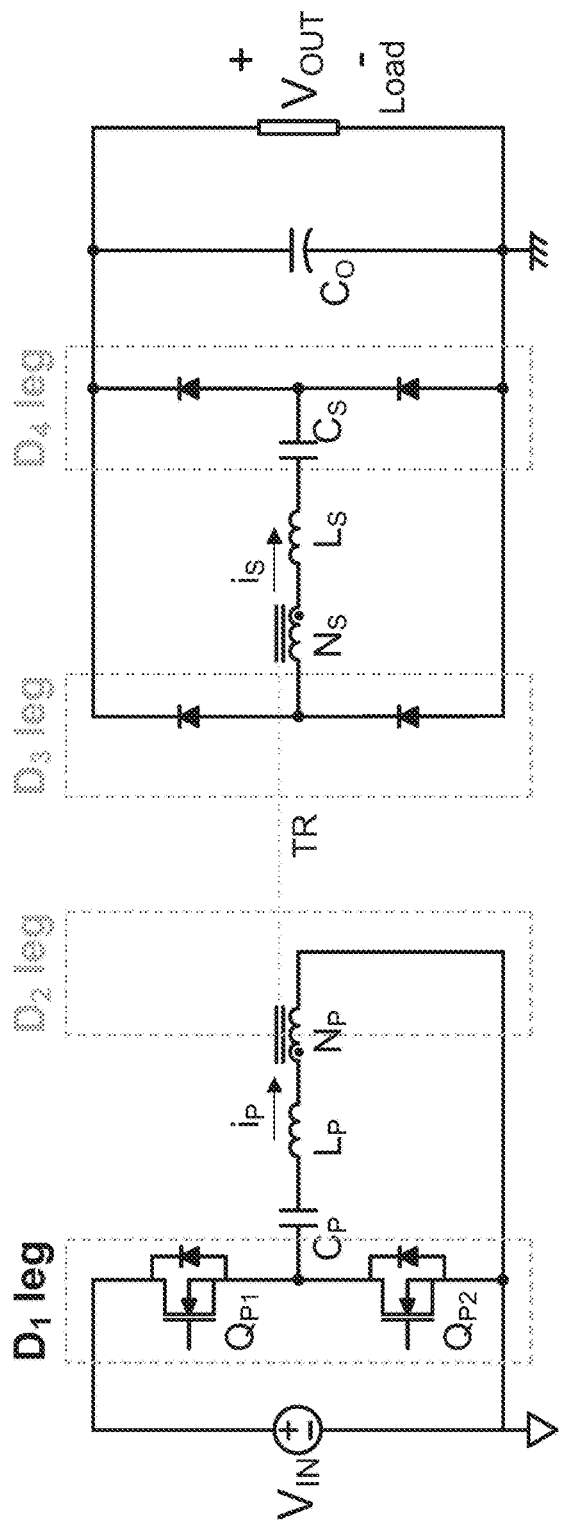
FIGS. 13A and 13B respectively illustrate an equivalent circuit and the key operating waveforms of the converter in FIG. 10 with the control scheme in the $D_1$ region of FIG. 11, especially FIG. 11. Notations $Q_{P1}$, $Q_{P2}$, $Q_{P3}$ and $Q_{P4}$ represent the switch-control signals for corresponding primary side switches. Notations $Q_{S1}$, $Q_{S2}$, $Q_{S3}$, $Q_{S4}$, $Q_{S5}$, and $Q_{S6}$ represent the switch-control signals for the secondary side switches. Notations $i_{P1}$, $i_{P2}$, and $i_{P3}$ represent the primary side currents for each phase.
Figure 13B:
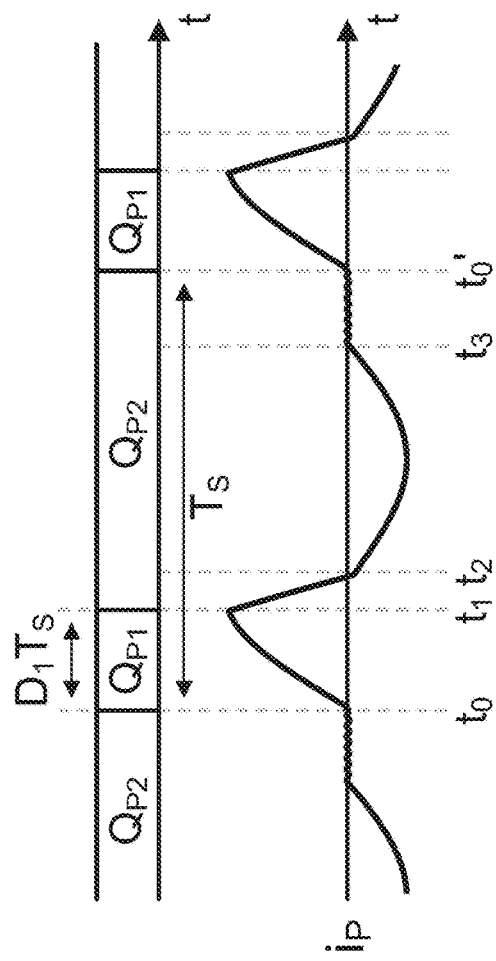

FIGS. 13A and 13B respectively illustrate an equivalent circuit and the key operating waveforms of converter 1000 in FIG. 10 with the control scheme in the $D_1$ region of FIG. 11. Referring to FIG. 13A, the main control variable is duty cycle signal $D_1$, so the $D_1$ leg is active. duty cycle signal $D_2$ is zero, which means that switch $Q_{P3}$ is completely turned off and switch $Q_{P4}$ is completely turned on. The $D_3$ and $D_4$ legs constitute a synchronous rectifier, so their operation is exactly the same as a diode rectifier. In one embodiment, the synchronous rectifier means that the gate signal of the MOSFET switches is turned on only when the current direction is from anode to cathode of its anti-parallel diode. In an alternative embodiment, switches in the $D_3$ and $D_4$ legs can be replaced by diodes. Referring to FIG. 13B, the switching period $T_S$ is a constant and very close to the resonant period determined by the resonant tank components. From $t_0$ to $t_1$ (during $D_1 T_S$), switch $Q_{P1}$ is turned on and resonant current $i_P$ is delivered to the output side through transformer TR and secondary side rectifier. After $t_1$, switch $Q_{P1}$ is turned off and resonant current $i_P$ decreases, but it is still positive. After $t_2$, resonant current $i_P$ becomes zero and negative resonance happens. Switch $Q_{P2}$ is turned on for a long time so that the negative resonant current is delivered during a half of the resonant period of resonant tank components, and it naturally becomes close to zero when the next switching period starts.

Figure 14A:
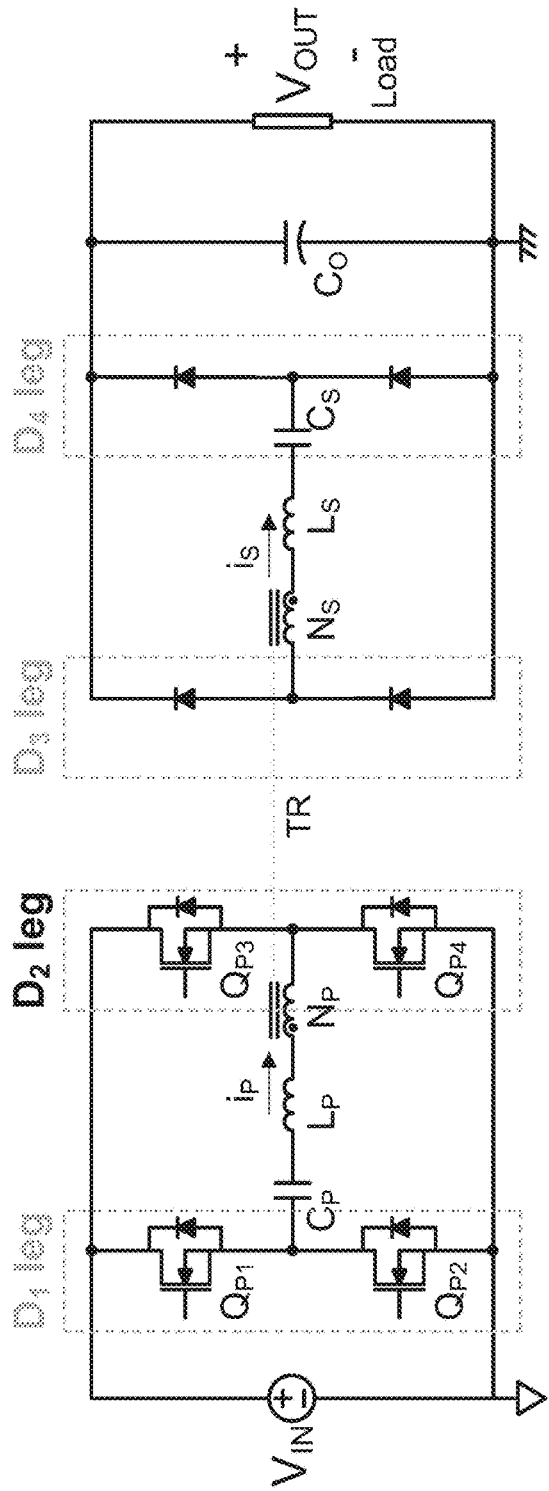
FIGS. 14A and 14B respectively illustrate an equivalent circuit and the key operating waveforms of the converter in FIG. 10 with the control scheme in the $D_2$ region of FIG. 11.
Figure 14B:
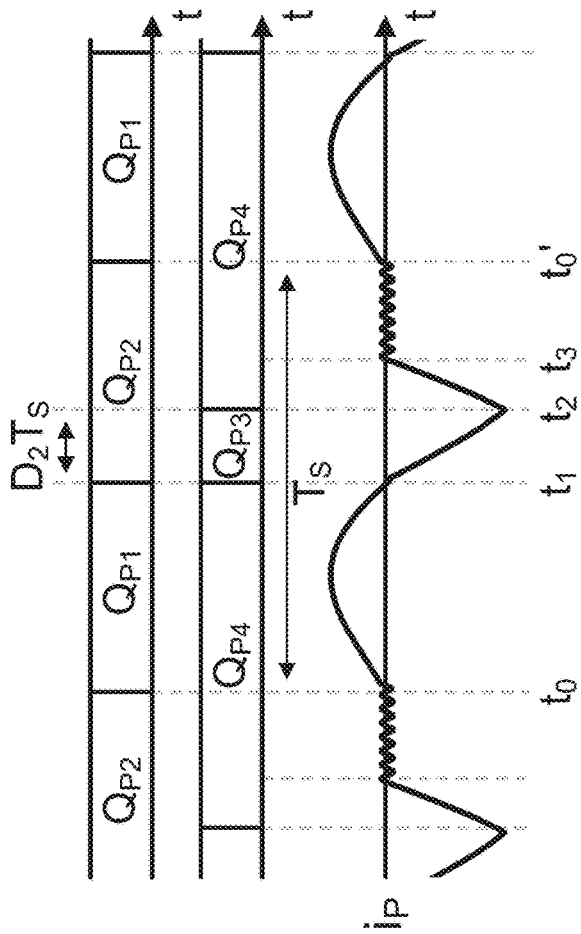

FIGS. 14A and 14B respectively illustrate an equivalent circuit and the key operating waveforms of converter 1000 in FIG. 10 with the control scheme in the $D_2$ region of FIG. 11. Referring to FIG. 14A, duty cycle of the $D_1$ leg is fixed at 0.5. Main control variable is the duty cycle signal $D_2$, so the $D_2$ leg becomes active. The $D_3$ and $D_4$ legs constitute a synchronous rectifier, so their operation is exactly the same as a diode rectifier. Referring to FIG. 14B, the switching period $T_S$ is still a constant and very close to the resonant period determined by the resonant tank components. From $t_0$ to $t_1$ (during $0.5 T_S$), switches $Q_{P1}$ and $Q_{P4}$ are turned on and resonant current $i_P$ is delivered to the output side through transformer TR and the secondary side rectifier. Switches $Q_{P1}$ and $Q_{P4}$ are turned on for a long time so that resonant current $i_P$ is delivered during a half of the resonant period of resonant tank components, and it becomes close to zero when switches $Q_{P1}$ and $Q_{P4}$ are turned off at $t_1$. At $t_1$, switches $Q_{P1}$ and $Q_{P4}$ are turned off and switches $Q_{P2}$ and $Q_{P3}$ are turned on. Resonant current $i_P$ is negative and delivered to the secondary side. After switch $Q_{P3}$ is turned off and switch $Q_{P4}$ is turned on at $t_2$, the magnitude of resonant current $i_P$ decreases and it is delivered to the secondary side. After resonant current $i_P$ becomes zero at $t_3$, a small fluctuating current circulates through switches $Q_{P2}$, $Q_{P4}$ and transformer TR until a new switching period begins when switches $Q_{P2}$ and $Q_{P4}$ are turned off.

Figure 15A:
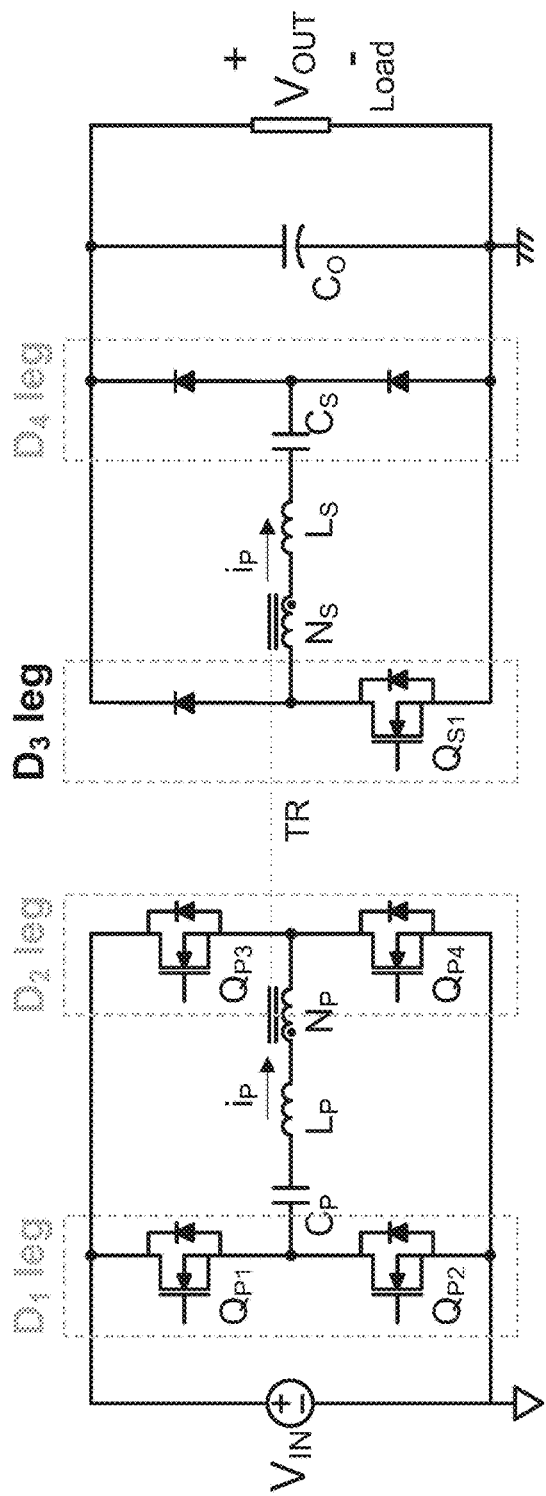
FIGS. 15A and 15B respectively illustrate an equivalent circuit and the key operating waveforms of the converter in FIG. 10 with the control scheme in the $D_3$ region of FIG. 11.
Figure 15B:
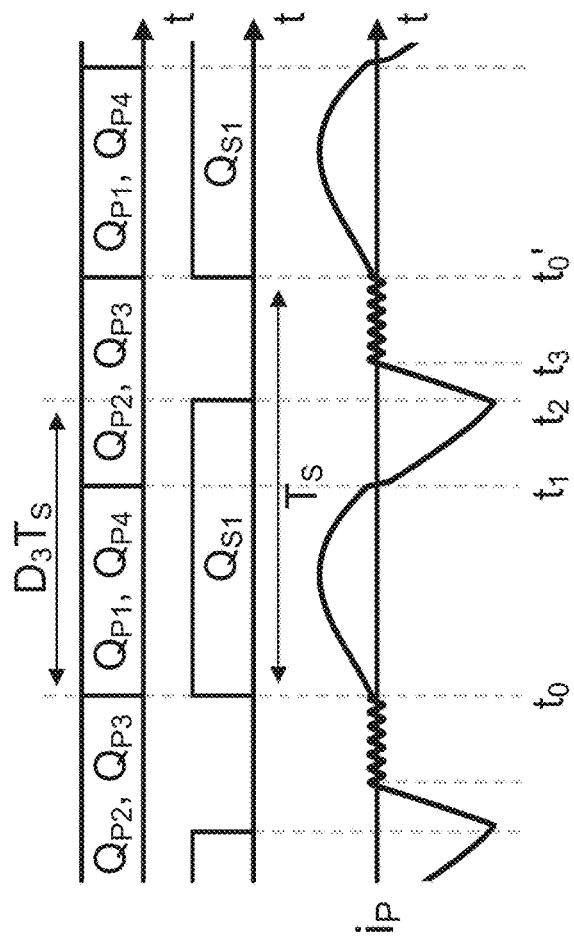

FIGS. 15A and 15B respectively illustrate an equivalent circuit and the key operating waveforms of the converter in FIG. 10 with the control scheme in the $D_3$ region of FIG. 11. Referring to FIG. 15A, duty cycle of the $D_1$ and $D_2$ legs are fixed at 0.5. Main control variable is duty cycle signal $D_3$, so switch $Q_{S1}$ is represented as an active switch instead of a diode. Switches $Q_{S2}$, $Q_{S3}$, and $Q_{S4}$ are represented as diodes. This is because they constitute a synchronous rectifier, and their operation is exactly the same as a diode rectifier. Referring to FIG. 15B, switching period $T_S$ is still a constant and very close to the resonant period determined by the resonant tank components. From $t_0$ to $t_1$ (during $0.5T_S$), switches $Q_{P1}$ and $Q_{P4}$ are turned on and resonant current $i_P$ is delivered to the output side through transformer TR, switch $Q_{S1}$, and the other secondary side rectifier components. Switches $Q_{P1}$ and $Q_{P4}$ are turned on for a long time so that the resonant current is delivered during a half of the resonant period of resonant tank components, and it becomes close to zero when switches $Q_{P1}$ and $Q_{P4}$ are turned off at $t_1$. At $t_1$, switches $Q_{P1}$ and $Q_{P4}$ are turned off and switches $Q_{P2}$ and $Q_{P3}$ are turned on. Because duty cycle signal $D_3$ is greater than 0.5, switch $Q_{S1}$ is still turned on so that current $i_P$ is not delivered to output filter capacitor $C_O$, but boosted fast. After switch $Q_{S1}$ is turned off at $t_2$, boosted current $i_P$ is delivered to output filter capacitor $C_O$ and the magnitude of current $i_P$ decreases. After current $i_P$ becomes zero at $t_3$, a small fluctuating current circulates through switches $Q_{P2}$, $Q_{P3}$ and transformer TR until a new switching period begins when switches $Q_{P2}$ and $Q_{P3}$ are turned off.

Figure 16A:
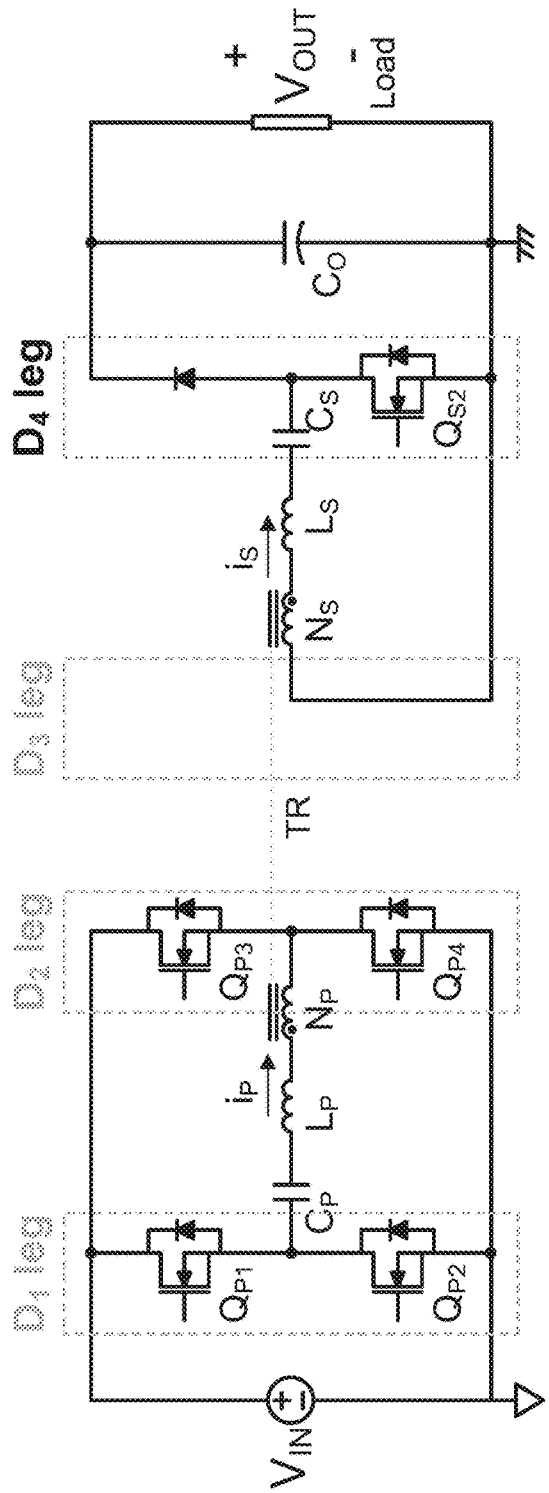
FIGS. 16A and 16B respectively illustrate an equivalent circuit and the key operating waveforms of the converter in FIG. 10 with the control scheme in the $D_4$ region of FIG. 11.
Figure 16B:
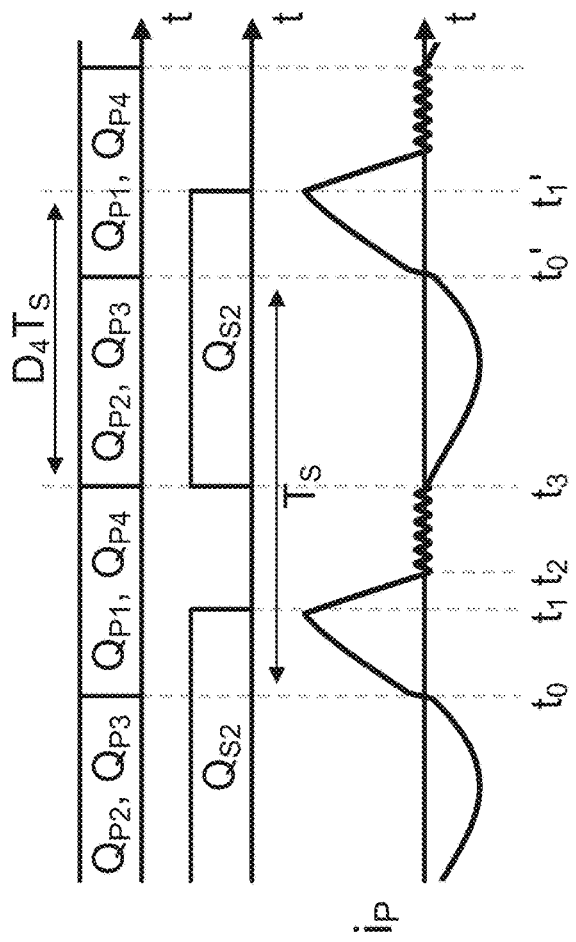

FIGS. 16A and 16B respectively illustrate an equivalent circuit and the key operating waveforms of the converter in FIG. 10 with the control scheme in the $D_4$ region of FIG. 11. Referring to FIG. 16A, duty cycle of the $D_1$ and $D_2$ legs is fixed at 0.5 and the duty cycle of the $D_3$ leg is fixed at 1.0. Accordingly, switch $Q_{S1}$ is completely turned on and switch $Q_{S3}$ is completely turned off. Main control variable is duty cycle signal $D_4$, so switch $Q_{S2}$ is represented as an active switch instead of a diode. Switch $Q_{S4}$ is represented as a diode. This is because it constitutes a synchronous rectifier, and its operation is exactly the same as a diode. Referring to FIG. 16B, switching period $T_S$ is still a constant and very close to the resonant period determined by the resonant tank components. From $t_0$ to $t_1$ (during $0.5T_S$), switches $Q_{P1}$, $Q_{P4}$, and $Q_{S2}$ are turned on and resonant current $i_P$ is boosted through transformer TR and switches $Q_{S1}$ and $Q_{S2}$. After switch $Q_{S2}$ is turned off at $t_1$, boosted resonant current is delivered to output filter capacitor $C_O$ through switch $Q_{S4}$. After resonant current $i_P$ becomes zero at $t_2$, a small fluctuating current circulates through switches $Q_{P1}$ and $Q_{P4}$. After switches $Q_{P1}$ and $Q_{P4}$ are turned off at $t_3$, switches $Q_{P2}$, $Q_{P3}$, and $Q_{S2}$ are turned on and resonant current $i_P$ charges $C_S$ through transformer TR and switches $Q_{S1}$ and $Q_{S2}$.

Figure 17A:
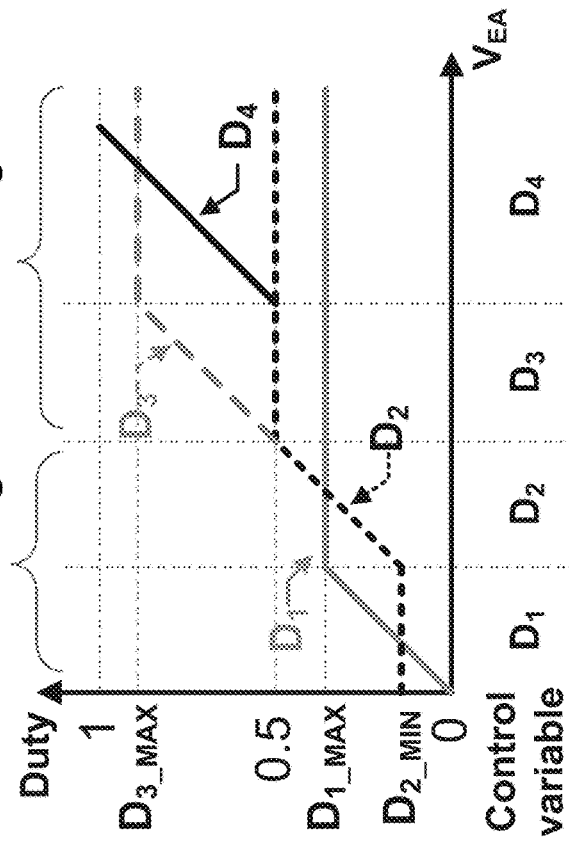
FIGS. 17A and 17B respectively illustrate an exemplary diagram that represents the relationship between $V_{EA}$ and duty cycle signals $D_1$, $D_2$, $D_3$, and $D_4$, in accordance with alternative embodiments of the present disclosure.
Figure 17B:
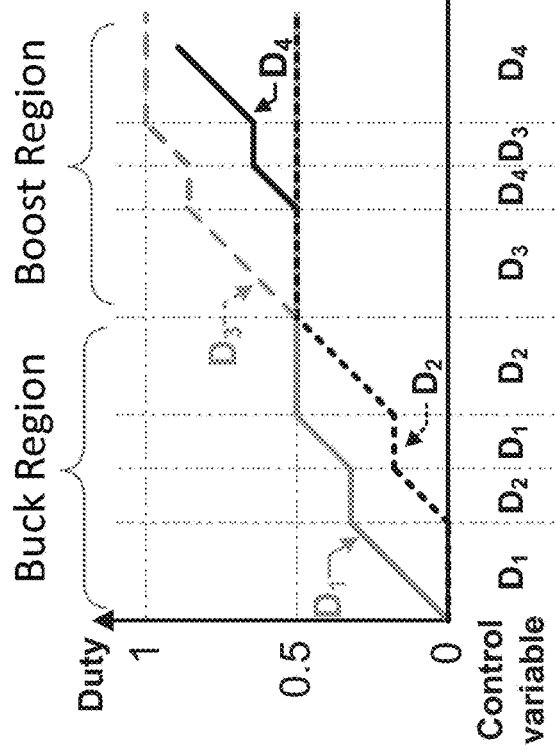

FIGS. 17A and 17B respectively illustrate an exemplary diagram that represents the relationship between $V_{EA}$ and duty cycle signals $D_1$, $D_2$, $D_3$, and $D_4$, in accordance with alternative embodiments of the present disclosure. One purpose of the present disclosure is to provide continuous voltage conversion ratio versus $V_{EA}$. Therefore, the order of control variables $D_1$, $D_2$, $D_3$, and $D_4$ can be changed or even mixed, as long as at least one of them varies continuously as $V_{EA}$ varies. As shown in FIG. 17A, the order of $D_1$, $D_2$, $D_3$, and $D_4$ can be mixed or even changed in their respective buck or boost regions. FIG. 17B shows another variation of the control method. As long as at least one control variable changes as $V_{EA}$ changes, the maximum or minimum value of $D_1$, $D_2$, $D_3$, and $D_4$ can be any values. The maximum and minimum values of $D_1$ and $D_2$ can be set to be between 0.0 and 0.5. Also, the maximum and minimum values of $D_3$ and $D_4$ can be set to be between 0.5 and 1.0.

Figure 18A:
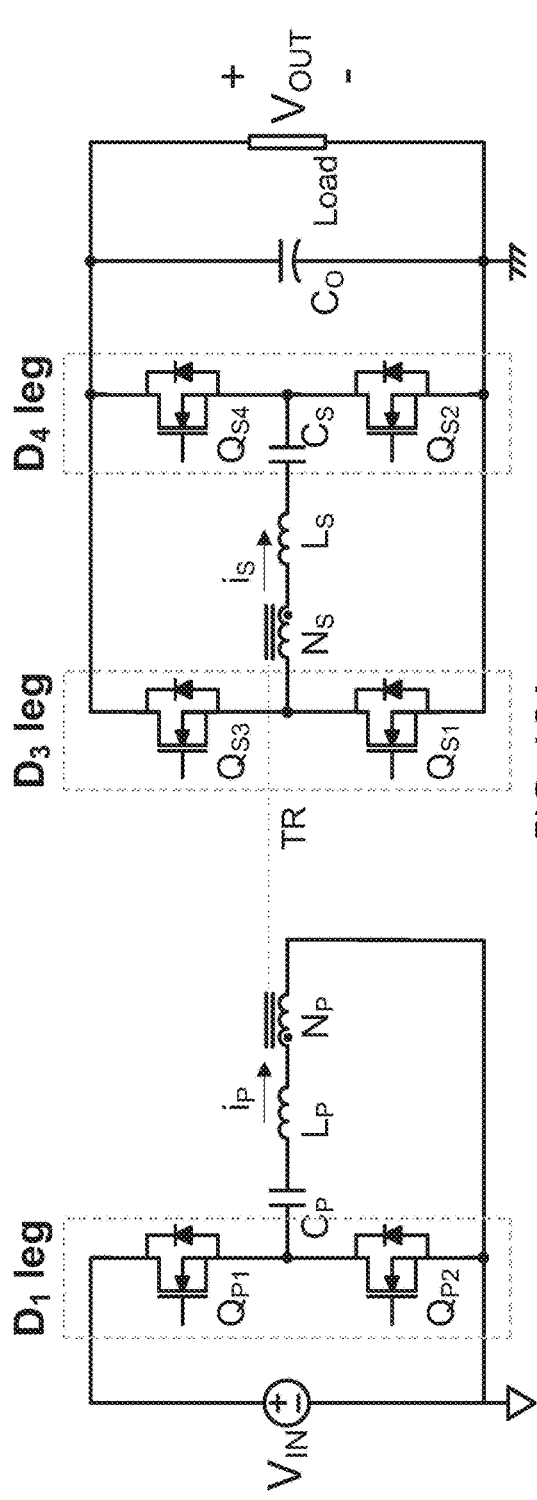
FIGS. 18A through 18E respectively illustrate a single-phase isolated series resonant converter in accordance with various embodiments of the present disclosure.
Figure 18B:
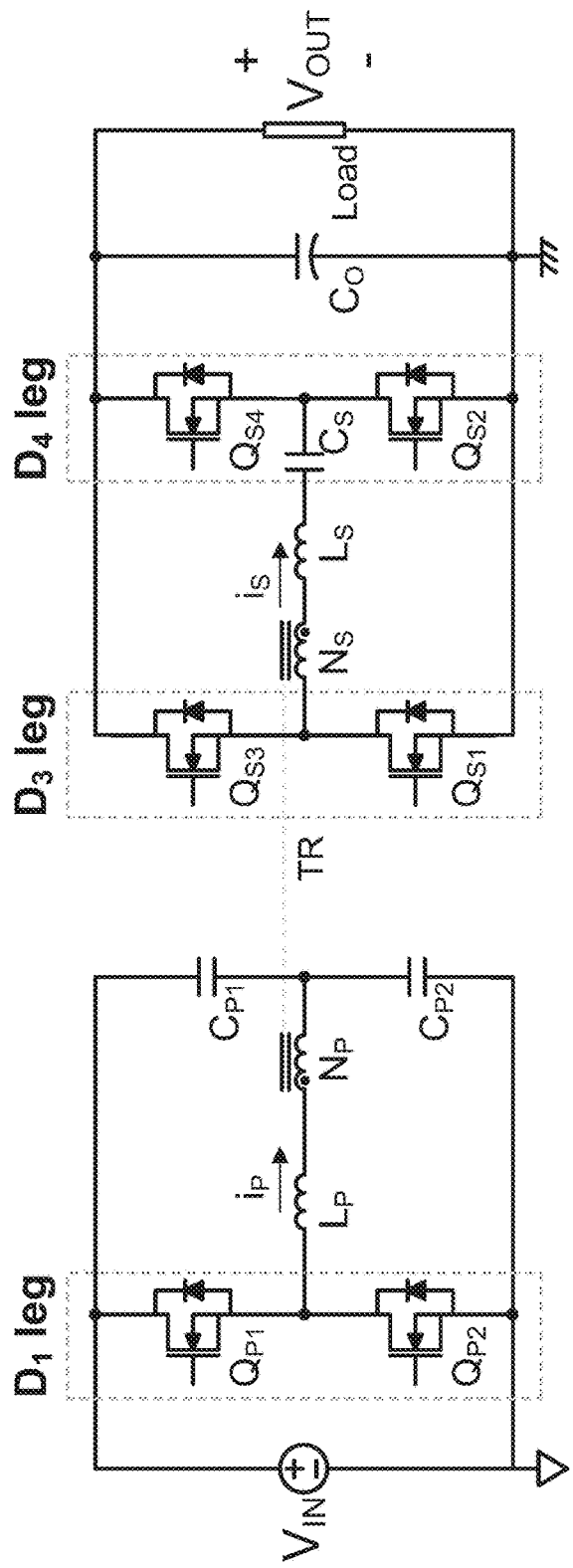
Figure 18C:
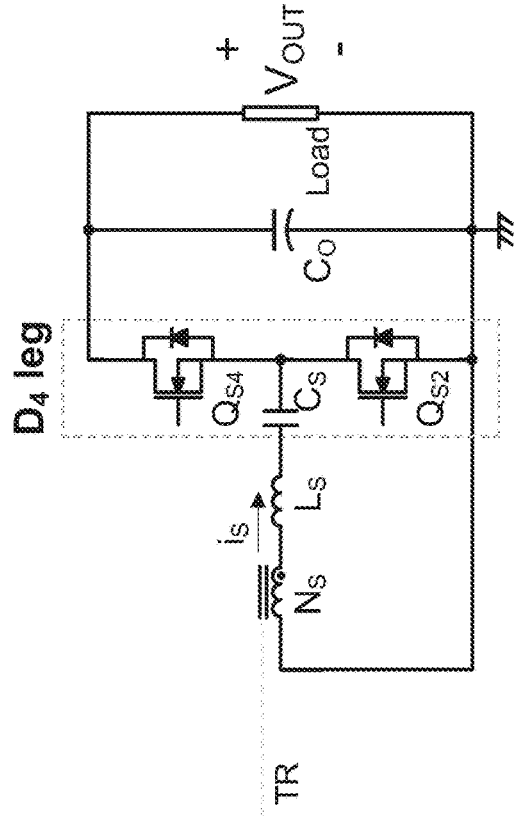
Figure 18C:
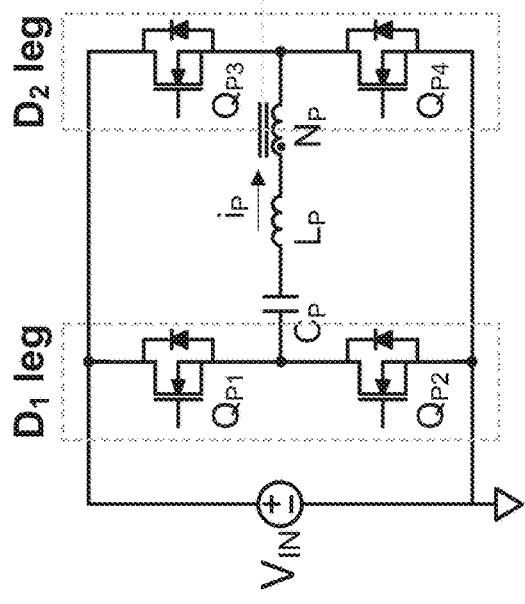
Figure 18D:
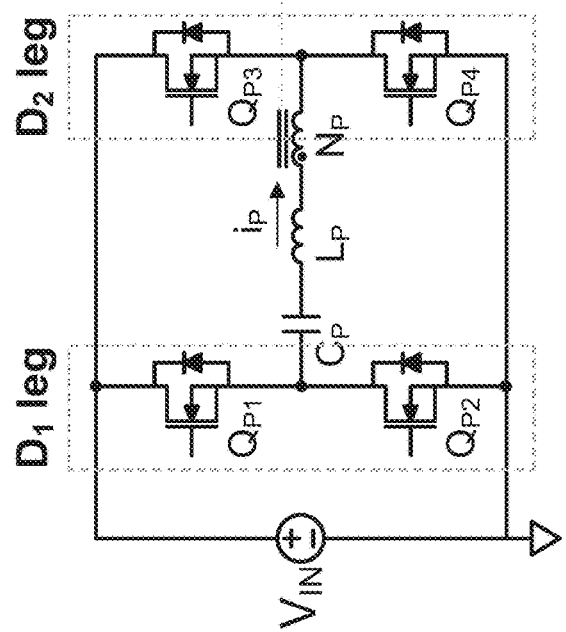
Figure 18E:
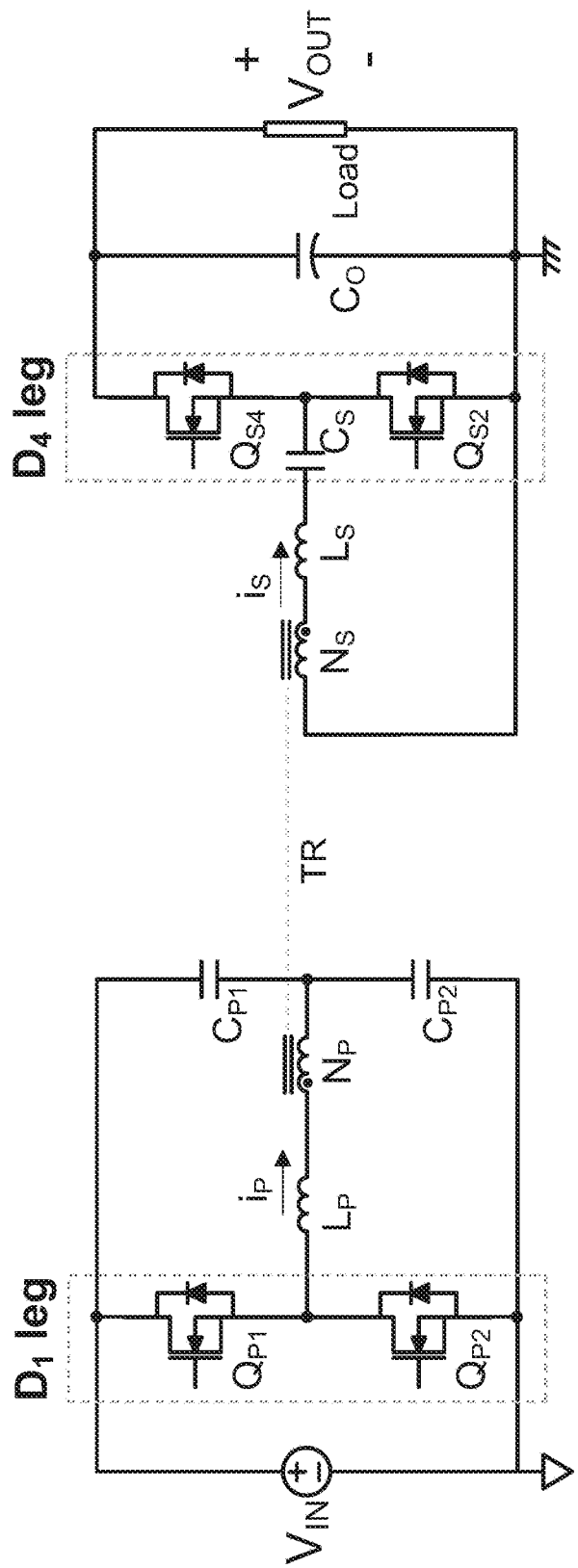

FIGS. 18A through 18E respectively illustrate a single-phase isolated series resonant converter with different number of switching legs, in accordance with various embodiments of the present disclosure. Depending on the range of gain, the number of legs in the converter is also changeable. FIGS. 18A and 18B shows exemplary embodiments with the presence of the $D_1$, $D_3$, and $D_4$ legs. As shown in FIG. 18A, in this embodiment, switch $Q_{P3}$ in leg $D_2$ is always off while switch $Q_{P4}$ in leg $D_2$ is always on. As shown in FIG. 18B, in this embodiment, switches $Q_{P3}$ and $Q_{P4}$ in leg $D_2$ are respectively replaced by capacitors $C_{P1}$ and $C_{P2}$. FIGS. 18C and 18D shows exemplary embodiments with the presence of the $D_1$, $D_2$, and $D_4$ legs. As shown in FIG. 18C, in this embodiment, switch $Q_{S3}$ in leg $D_3$ is always off while switch $Q_{S1}$ in leg $D_2$ is always on. As shown in FIG. 18D, in this embodiment, switches $Q_{S3}$ and $Q_{S1}$ in leg $D_3$ are respectively replaced by capacitors $C_{S1}$ and $C_{S2}$. FIG. 18E shows an exemplary embodiment with only the $D_1$ and $D_4$ legs are selected. It is appreciated that any combination of two out of four legs (any one leg in the primary side and any one leg in the secondary side) is possible to apply the control method as shown and described in the present disclosure.

The present disclosure provides control methods for a multi-phase converter that offer a wider range of voltage conversion ratio, thereby resulting in performance improvement. Specifically, the control methods of the present disclosure provide improved performance in single- and multi-phase converters with a wide input voltage range or a wide output voltage range (or both) by substantially reducing the switching frequency range. Reduction in the switching frequency range is achieved by controlling the output voltage or current with a combination of variable-duty ratio, variable-frequency, and delay-time control.

According to one embodiment of the present disclosure, variable-duty ratio and variable-frequency control may be used to control the primary and secondary side switches of a multi-phase isolated resonant converter, while delay-time control may be used to control secondary switches provided in place of diode rectifiers. The switch-control signals for secondary side switches in a phase of a multi-phase resonant converter may be implemented by sensing the secondary or primary side current (or both) in the phase and by delaying the turning-off instant of the corresponding secondary side switch with respect to a zero crossing in the secondary current or the primary current in the phase.

The zero crossing of the current related to the delay-time control may be either negative-to-positive or positive-to-negative, but not both, because the switch-control signals for the secondary side switch is delayed asymmetrically. Otherwise, the delay-time control may be simply implemented by delaying the turning-off instant of the corresponding secondary side switch with respect to the turning-off instant of the corresponding primary side switch. The primary and secondary switches operate with substantially the same switching frequency, but a duty ratio of each primary and secondary side switch may vary according to designer's choice and delay-time.

It should be noted that the delay-time control is applied to only one switch in a leg of the secondary side rectifier. If the delay-time control is applied to a switch in a leg of the secondary side rectifier, the delay-time control is not applied to the other switch in the leg to minimize circulating current, which means the turning-off instant becomes either the zero crossing of the current or the turning-off timing of the corresponding primary side switch, whichever is earlier. To achieve ZVS operation, a short dead time is introduced between the turning-off instant of a switch and the corresponding turning-on instant of the complementary switch in both primary and secondary sides.

For the purposes of describing and defining the present disclosure, it is noted that terms of degree (e.g., "substantially," "slightly," "about," "comparable," etc.) may be utilized herein to represent the inherent degree of uncertainty that may be attributed to any quantitative comparison, value, measurement, or other representation. Such terms of degree may also be utilized herein to represent the degree by which a quantitative representation may vary from a stated reference (e.g., about 10% or less) without resulting in a change in the basic function of the subject matter at issue. Unless otherwise stated herein, any numerical value appearing in the present disclosure are deemed modified by a term of degree (e.g., "about"), thereby reflecting its intrinsic uncertainty.

Although various embodiments of the present disclosure have been described in detail herein, one of ordinary skill in the art would readily appreciate modifications and other embodiments without departing from the spirit and scope of the present disclosure as stated in the appended claims.

What is claimed is:

1. An isolated resonant converter, comprising:
    one or more phases, wherein each phase comprises a transformer, a set of resonant components, a set of primary side switches electrically coupling an input terminal to the transformer through the resonant components, and a set of secondary side switches electrically coupling the transformer to an output terminal; and
    a control circuit electrically coupled to said one or more phases, wherein the control circuit is configured to:
    detect an input voltage at the input terminal and an output voltage at the output terminal,
    determine first control signals for the primary side switches and second control signals for the secondary side switches, based on a plurality of parameters including physical properties of the resonant components, the input voltage, the output voltage, and a reference voltage, and
    transmit to the primary side switches the first control signals having a switching frequency and a first duty ratio, and
    transmit to the secondary side switches the second control signals having the switching frequency and a second duty ratio,
    wherein the second duty ratio for a first one of the secondary side switches is greater than the first duty ratio for a first corresponding one of the primary side switches, and
    wherein the first and second duty ratios increase monotonously,
    wherein the control circuit comprises:
        a sensing and scaling circuit configured to receive the input and output voltages and to convert the input and output voltages into scaled input and output voltages;
        a subtractor circuit configured to receive the scaled output voltage and to generate an error signal by subtracting the scaled output voltage from the reference voltage;
        an error amplifier configured to receive the error signal and to generate an amplified and compensated error signal; and
        a processor circuit configured to receive the scaled input voltage and the amplified and compensated error signal, and to generate the first and second control signals for the primary and secondary side switches based on both the scaled input voltage and the amplified and compensated error signal.

2. The isolated resonant converter of claim 1, wherein the second duty ratio for a second one of the secondary side switches is defined with respect to a turning off instant of a second corresponding one of the primary side switches.

3. The isolated resonant converter of claim 1, wherein the control circuit is further configured to detect an electric current flowing through each of said one or more phases.

4. The isolated resonant converter of claim 3, wherein the second duty ratio for a second one of the secondary side switches is defined with respect to a positive-to-negative or negative-to-positive zero crossing instant of the electric current.

5. The isolated resonant converter of claim 1, wherein the control circuit further comprises a zero-current detector (ZCD) configured to detect an electric current signal flowing through each of said one or more phases.

6. The isolated resonant converter of claim 5, wherein the processor circuit is further configured to receive the electric current signal and to generate the first and second control signals for the primary and secondary side switches based on the scaled input voltage, the amplified and compensated error signal, and the electric current signal.

7. The isolated resonant converter of claim 1, wherein said one or more phases comprise at least two phases, and wherein the control circuit further comprises a current balancing circuit configured to modify the second control signals before being transmitted to the secondary side switches such that electric currents flowing through different ones of said at least two phases are balanced with each other.

8. The isolated resonant converter of claim 7, wherein the current balancing circuit further comprises:
    a current sensing, scaling, and averaging circuit configured to obtain an averaged magnitude of the electric current flowing through each of said at least two phases; and
    a delay-time adder configured to determine a delay time for each of said at least two phases based on a difference of the electric currents between selected two of said at least two phases and to modify the second control signals by adding the delay time to the second duty ratio of the second control signals.

9. A method for controlling an isolated resonant converter having one or more phases, wherein each phase comprises a transformer, a set of resonant components, a set of primary side switches electrically coupling an input terminal to the transformer through the resonant component, and a set of secondary side switches electrically coupling the transformer to an output terminal, the method comprising:

- detecting an input voltage at the input terminal of the isolated resonant converter and an output voltage at the output terminal of the isolated resonant converter;
- determining, from a plurality of parameters, first control signals for the primary side switches and second control signals for the secondary side switches, wherein the parameters comprise physical properties of the resonant components, the input voltage, the output voltage, and a reference voltage;
- transmitting to the primary side switches the first control signals having a switching frequency and a first duty ratio;
- transmitting to the secondary side switches the second control signals having the switching frequency and a second duty ratio;
- receiving the input and output voltages and converting the input and output voltages into scaled input and output voltages;
- receiving the scaled output voltage and generating an error signal by subtracting the scaled output voltage from the reference voltage;
- receiving the error signal and generating an amplified and compensated error signal; and
- receiving the scaled input voltage and the amplified and compensated error signal, and generating the first and second control signals for the primary and secondary side switches based on both the scaled input voltage and the amplified and compensated error signal;
- wherein the second duty ratio for a first one of the secondary side switches is greater than the first duty ratio for a first corresponding one of the primary side switches;
- wherein the first and second duty ratios increase monotonously.

10. The method of claim 9, wherein the second duty ratio for a second one of the secondary side switches is defined by a turning off instant of a second corresponding one of the primary side switches.

11. The method of claim 9, further comprising detecting an electric current flowing through each of said one or more phases.

12. The method of claim 11, wherein the second duty ratio for a second one of the secondary side switches is defined by a positive-to-negative or negative-to-positive zero crossing instant of the electric current.

13. The method of claim 9, further comprising modifying the second control signals before transmitting to the secondary side switches such that electric currents flowing through different ones of said phases are balanced with each other.

* * * * *